US011263713B2

(12) United States Patent
Howe et al.

(10) Patent No.: US 11,263,713 B2
(45) Date of Patent: Mar. 1, 2022

(54) INSPECTION SYSTEM AND RELATED METHODS

(71) Applicant: Bert Howe & Associates, Anaheim Hills, CA (US)

(72) Inventors: James Howe, Newport Coast, CA (US); Norman Aleman, Montclair, CA (US)

( * ) Notice: Subject to any disclaimer, the term of this patent is extended or adjusted under 35 U.S.C. 154(b) by 36 days.

(21) Appl. No.: 16/818,875

(22) Filed: Mar. 13, 2020

(65) Prior Publication Data

US 2020/0219213 A1 Jul. 9, 2020

Related U.S. Application Data

(63) Continuation of application No. 16/141,929, filed on Sep. 25, 2018, now Pat. No. 10,991,058, which is a continuation of application No. 14/714,725, filed on May 18, 2015, now Pat. No. 10,672,089.

(60) Provisional application No. 62/039,371, filed on Aug. 19, 2014.

(51) Int. Cl.
*G06Q 50/16* (2012.01)
*H04N 7/18* (2006.01)

(52) U.S. Cl.
CPC .......... *G06Q 50/163* (2013.01); *H04N 7/183* (2013.01)

(58) Field of Classification Search
None
See application file for complete search history.

(56) References Cited

U.S. PATENT DOCUMENTS

| | | | |
|---|---|---|---|
| 2006/0155571 A1* | 7/2006 | Almeida | G06Q 30/0601 705/26.1 |
| 2011/0050888 A1* | 3/2011 | Shibukawa | H04N 1/00411 348/135 |
| 2013/0060710 A1* | 3/2013 | Preuss | G06Q 50/163 705/314 |
| 2014/0279594 A1* | 9/2014 | Obrokta | G06Q 50/163 705/314 |
| 2014/0365335 A1* | 12/2014 | Tyshuk | G06Q 30/0623 705/26.61 |

* cited by examiner

*Primary Examiner* — Dennis W Ruhl
(74) *Attorney, Agent, or Firm* — Roland J. Tong

(57) ABSTRACT

A property inspection system includes a mobile inspection device, a camera, a project template generator, a report generator, and an image association program. The project template generator guides the user through an inspection project. The report generator provides a list of defects, along with the number of occurrences of each defect and the number of locations where the defect can be found. The image association program creates a record for each still image taken by the camera, the record including the name, location, and sublocation of the defect shown in the still image. The image association program may also associate video of a defect with the still images of the defect.

6 Claims, 27 Drawing Sheets

Property Inspected Report

Project: 17-5055 Gridsham Estates

11315 Austen Way

| Associate | Date | Inspection Type | Photo Count |
|---|---|---|---|
| GCC | 3/12/2018 | VISUAL | 78 |
| MAS | 12/5/2017 | VISUAL | 80 |

Total Photos, This Address: 158

11346 Austen Way

| Associate | Date | Inspection Type | Photo Count |
|---|---|---|---|
| GCC | 12/6/2017 | VISUAL | 84 |
| MAS | 12/5/2017 | VISUAL | 72 |

Total Photos, This Address: 156

11412 Austen Way

| Associate | Date | Inspection Type | Photo Count |
|---|---|---|---|
| GCC | 3/12/2018 | VISUAL | 112 |
| MAS | 12/5/2017 | VISUAL | 77 |

Total Photos, This Address: 189

11337 Bronte Place

| Associate | Date | Inspection Type | Photo Count |
|---|---|---|---|
| GCC | 12/2/2017 | VISUAL | 85 |
| MAS | 12/2/2017 | VISUAL | 75 |

FIG. 41

INSPECTION SYSTEM AND RELATED METHODS

CROSS-REFERENCE TO RELATED APPLICATIONS

This application is a continuation of U.S. non-provisional application Ser. No. 16/141,929, filed Sep. 25, 2018. U.S. non-provisional application Ser. No. 16/141,929 is a continuation of U.S. non-provisional application Ser. No. 14/714,725, filed May 18, 2015, which claims the benefit of U.S. provisional application Ser. No. 62/039,371 filed Aug. 19, 2014. The disclosures of each of the foregoing application are hereby incorporated by reference in their entirety.

TECHNICAL FIELD

The present disclosure relates to software applications for mobile devices, particularly applications for use in conducting inspections for real estate and construction and generating inspection reports.

BACKGROUND

Mobile devices are starting to be used as inspection tools for conducting real estate inspections. SnapInspect App (www.snapinspect.com) of SnapInspect International LLC and HG Companion software of HomeGauge of Asheville, N.C. (www.internachigauge.com) provide programs that enable mobile devices to be used in real estate inspections. With HG Companion, the user has to transfer the photos and videos to a laptop or desktop computer to create and complete a report. One common problem with both software programs is that they offer fixed inspection checklist or templates. For instance, if you have downloaded a template for a 3 bedroom house and the house you inspect has a 3 bedroom plus a bonus room, you cannot add the bonus room into your inspection because it is not in the template. They also have no floor plans within the system, so it may be confusing to distinguish one bedroom from another. Photos or videos for the bedrooms may easily be mixed up.

Another problem with both software programs is that they do not have the ability to label the videos with displayed text, such as the location where the video was taken. Thus, videos may get misidentified. Yet another problem with the above software program is that their programs allow users to skip taking photos or videos of certain inspection locations or completing information related to a photo or a video. Inspectors may have to return to the inspection site because they failed to take photos or videos of an important location, or because they could not remember the details they needed to add to a photo or video. Finally, a problem with the above software program is they are designed for inspecting a single property. They cannot provide comparisons between the multiple properties inspected. Thus, if you want any statistical data based on multiple properties that were inspected, these two software programs will not provide them.

SUMMARY

One aspect of the present disclosure is a method for conducting property inspections using a mobile device that has a camera and a computer. The computer includes a processor, memory and communications interface, and is programmed to perform several steps of the method. The steps of the method include: providing a floor plan of a property to be inspected; dividing the floor plan into a plurality of inspection locations; storing the floor plan and the inspection locations in the memory; providing a description of a defect within an inspection location; capturing an image from the inspection location using the camera; storing the image into the memory; and associating the image with the inspection location and the description of its defect. The image may be a digital photograph or a video. The method may also include the step of providing a plurality of sublocations within an inspection location, or the step of providing a measurement of the defect. Optionally, the method includes the step of providing a plurality of inspected properties. Each of the plurality of inspected properties may include an inspection location, a corresponding sublocation, a description of the defect of the inspection location or sublocation, and an associated image of the inspection location or sublocation. The method may further include the step of generating a report listing all the inspected properties and their respective inspection locations, defect descriptions, and associated images. The report may include a number of images associated with each inspected property.

Another aspect of the present disclosure is a property inspection system that includes a mobile inspection device, a computer having a memory configured to store a program, and a processor to execute the program. The mobile inspection device has an interface programmed to allow the user to interact with the program. The memory includes floor plans for a plurality of properties, a list of locations associated with each floor plan, and a list of names of potential defects associated with each location.

The property inspection system may also include a project template generator that communicates with the interface and provides a plurality of inspection projects, each of which includes a plurality of inspection locations based on a property floor plan and a plurality of possible defects relating to an inspection location. When executed by the processor, the project template generator guides the user through an inspection project with a template that sequentially displays the listed locations and potential defects associated with the floor plan of a selected property. In some aspects of the disclosure, the locations are further divided into sub locations that are also included in the template.

The property inspection system may also include a report generator that communicates with the interface and is executed by the processor to process requests for reports. In certain embodiments, the report generator is adapted to provide a list of all properties inspected, number of inspections conducted per property, and the number of images generated per inspection. In other embodiments, the report generator is adapted to provide a list of all inspection locations of a property and images and description of defects related to each inspection location. The report generator may further be adapted to provide a list of defects and a number of inspection locations where each defect can be found and number of occurrences of each defect.

The property inspection system may also include a camera integrated within the mobile inspection device and configured to capture still images of the defects, and an image association program executed by the processor and configured to create a record for each still image, the record including the name, location, and sublocation of the defect shown in the still image. The images may be incorporated into the report generated by the report generator. In addition, the camera may be further configured to record videos and to the image association program may be configured to associate video of a defect with the still images of the defect.

In some embodiments, the property inspection system may also include a video labeler that labels and displays on the videos a project name, property address, and inspection location.

BRIEF DESCRIPTION OF THE DRAWINGS

FIG. 5 is a screenshot rendered by the inspection program where the user can capture an image from an inspection location, specify a project name, address, location, sublocation, category, details, and notes pertaining to the image captured.

FIG. 6 is a screenshot rendered by the inspection program where the user can enter a project name, inspection type, and associate initials.

FIG. 19 is a screenshot where a user can enter the number of occurrences of broken cabinet drawers or doors.

FIG. 20 is a screenshot where a user can enter the length of ceiling separation.

FIG. 31 is a screenshot of a screen showing a list of information gathered for a particular project.

FIG. 32 is a screenshot of a screen showing a photo or video thumbnail with data from all fields of a selected photo or video.

FIG. 38 is a screenshot of another formatted report.

FIG. 39 is a screenshot of another formatted report.

FIG. 41 is a screenshot of another formatted report.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
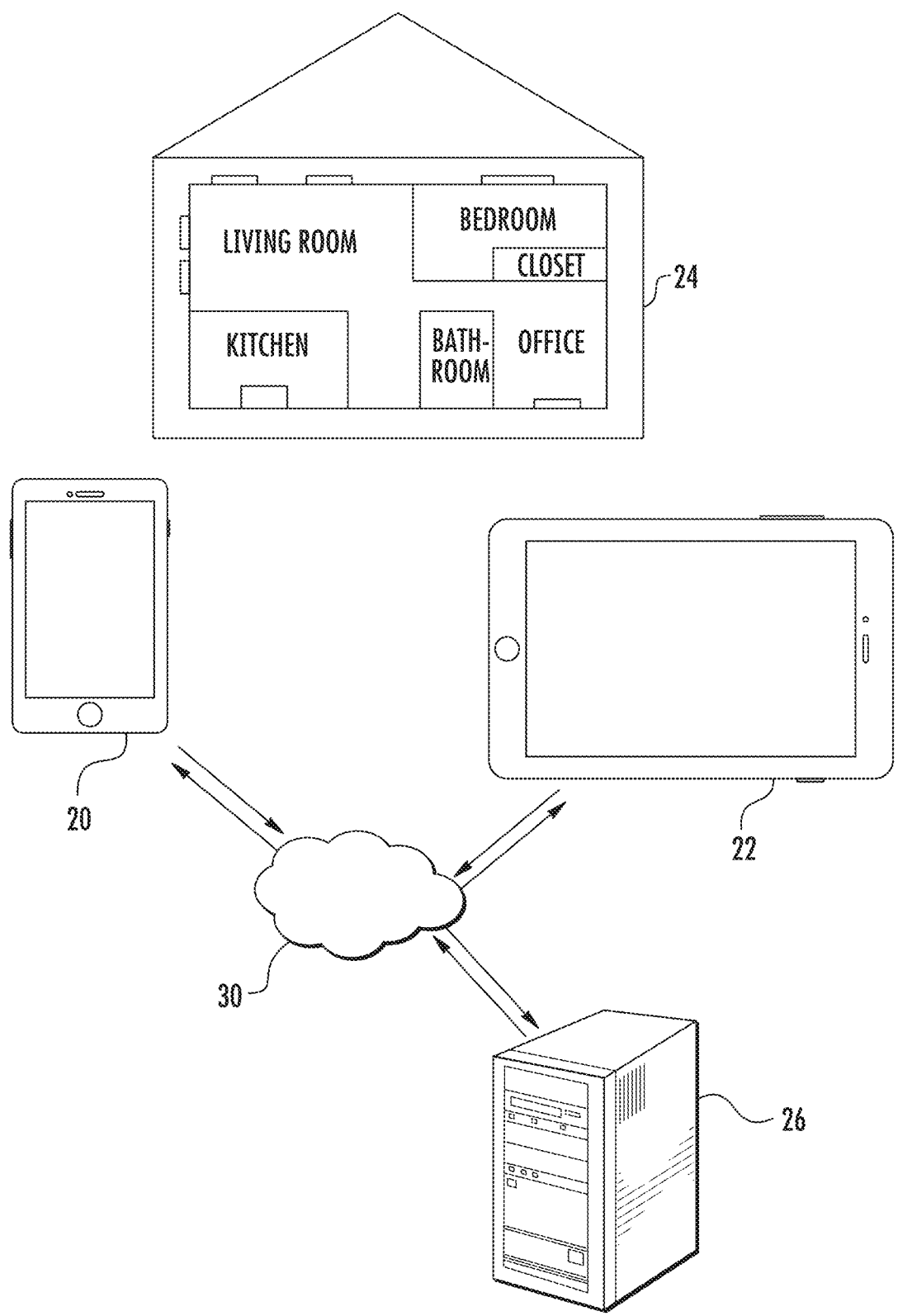
FIG. 1 is a diagram exemplifying an architecture of the present disclosure.

The present disclosure relates to a real estate inspection system. In FIG. 1, the real estate inspection system includes one or more inspection devices 20 and 22. Each inspection device 20 and 22 is adapted to capture images of several locations within an inspection site 24. The images may be digital photographs and videos of structures, appliances, or accessories that are of interest and that are present in various locations within the inspection site 24. The images may further be photos and videos showing defects of the structures, appliances, or accessories. The inspection devices 20 and 22 have user interfaces that allow users to specify the location within the inspection site 24 where the image was taken and add a description to the image, such as the number of occurrences of the defect in the same location or the size of the defect. The images, location, and description can be stored in a project file, and inspection reports can be generated using the data gathered and entered.

As examples, the inspection devices are smartphones or tablet computers. Each inspection device 20 and 22 may be operated as stand-alone devices having its own camera, computer, processor, input/output devices, and memory. In certain embodiments, the inspection devices have GPS and microphones. Their respective memory stores previously saved inspection projects, inspection forms or templates, or software programs for their processors to execute, such as the inspection program, field manager, image association program, video labeler, and the inspection report generator discussed below. Alternatively, the inspection devices may be able to connect to a server 26 via a network 30. The network 30 may be a content delivery network (CDN) built on the Internet, or it may be any network, including but not limited to a LAN, a MAN, a WAN, a mobile wired or wireless network, a private network, or a virtual private network. Server 26 may include web servers, application servers, and database servers. Server 26 may store previously saved inspection projects, inspection forms or templates, or software programs, such as inspection program, field manager, image association program, video labeler, and the inspection report generator discussed below. Inspection devices 20 and 22 and desktop or laptop computers may utilize a web browser to access the server 26. Inspection devices 20 and 22 may include client software that executes an authentication process to establish a logical connection with server 26 to receive and display inspection forms, templates, reports, and data.

Figure 2:
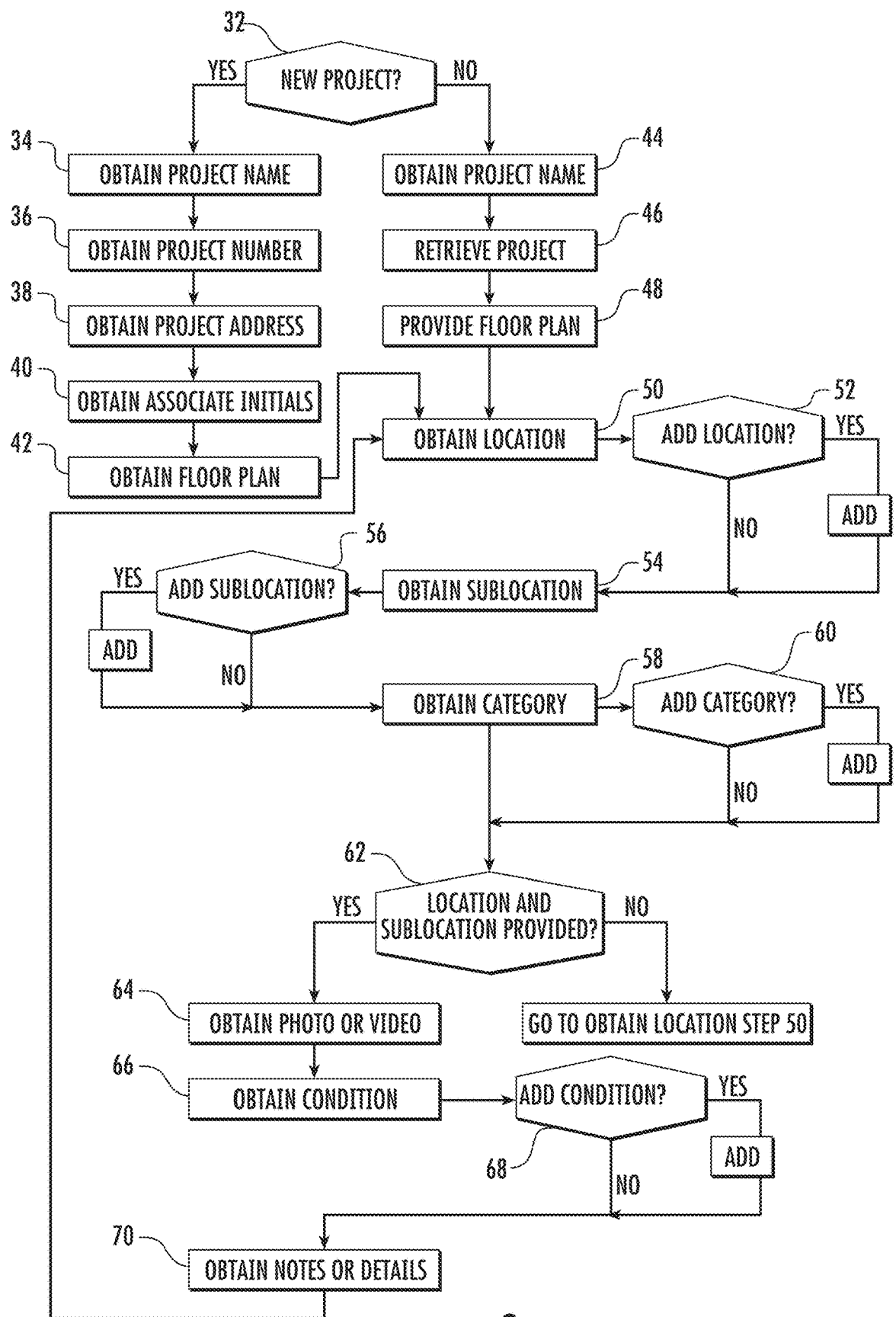
FIG. 2 is a flowchart showing the steps of an inspection program that are executed by the processors of the inspection devices or the server.

Referring now to FIG. 2, a flowchart shows the steps of an inspection program that are executed by the processors of the inspection devices 20 or 22, or the server 26. At step 32, the program asks the user whether he wants to work on an existing project or a new project. If it is a new project, the program obtains from the user a project name (step 34), a project number (step 36), a project address (step 38), and the user's initials (step 40). The program then asks the user to upload a floorplan (step 42). After the user completes the project set up, the program proceeds to step 50 and obtains an inspection location as further discussed below. If the user wants to work on an existing project, the program obtains from the user a project name (step 44). The program retrieves the project data at step 46 then provides the floor plan (step 48). The program stores several inspection locations within the project address or inspection site based on the floor plan. To illustrate, the program may store the following inspection locations: bath 1, bath 2, bedroom 1, bedroom 2, bedroom 3, dining room, entry, family room, front yard, garage, hall, kitchen, laundry, master bath, master bedroom, nook, powder room, roof, stairs, deck, and driveway. The program prompts the user to select an inspection location (step 50). If a desired inspection location is not listed or stored, the program provides the user an option to add a new inspection location (step 52). Once the inspection location is named, the program asks the user to name a sublocation (step 54). The program stores several sublocations, which can be a structure, an appliance, or an accessory that is within the inspection location. For instance, a sublocation can be a countertop, chimney chase, confined rake, closet, cabinet, ceiling, an access, an area drain, doors, drywall, wood fences, flatwork, framing, landscape, masonry, mechanical, paint, pluming, roofing-tile, siding, slab/foundation, tub/shower, or a bridge. If a desired sublocation is not listed or stored, the program provides the user an option to add a new sublocation (step 56).

Once the sublocation is named, the user may provide a trade category (step 58). The program stores several trade categories, which classify the sublocation. For instance, a trade category can be several classifications of countertops, such as countertops cultured marble, countertops granite, countertops laminate, countertops synthetic. Other trade categories include metal fences or wood fences. If a desired trade category is not listed or stored, the program provides the user an option to add a new trade category (step 60). The inspection program works with a field manager such that the next step (step 62) ensures that each inspection entry includes a location and a sublocation. If a location or a sublocation is missing, the field manager instructs the inspection program to go back to step 50 and asks the user to provide the missing location or sublocation. If the user has provided the missing inspection location or sublocation, the user can proceed and take a photo or video using the inspection device (step 64).

After the user takes a photo or video, the program prompts the user to name a negative condition (step 66). The program stores several conditions for every trade category. For instance, for the trade category of a stucco, the condition can be bp tear, crack, incomplete, spall, stain, weep screed, or missing. For the trade category of a cabinet, the condition can alignment, attachment, stain, ceiling separation, finish worn, trim separation, or wall separation. For the trade category of a deck, the condition can be cracked membrane, ponding, or reverse slope. For the trade category of a countertop granite, the condition can be backsplash/sidesplash separation. For the trade category of a door, the condition can be binding or casing separated. If a desired condition is not listed or stored, the program provides the user an option to add a new condition (step 68).

Once the condition has been specified, the program may ask for additional details of the condition (step 70). For instance, for cracks, the program may ask for the number of occurrences or the lengths of each crack. For spalls, the program may ask for the number of units by linear feet or square feet. For ceiling separation or worn finish, the program may ask for the total linear feet. The inspection program works with an image association program, which associates a project name, an inspection location, sublocation, a category or defect description, and any notes or details to the stored images. The inspection program also works with a report generator so that reports, such as those in FIGS. 36-41 can be generated.

Figure 4:
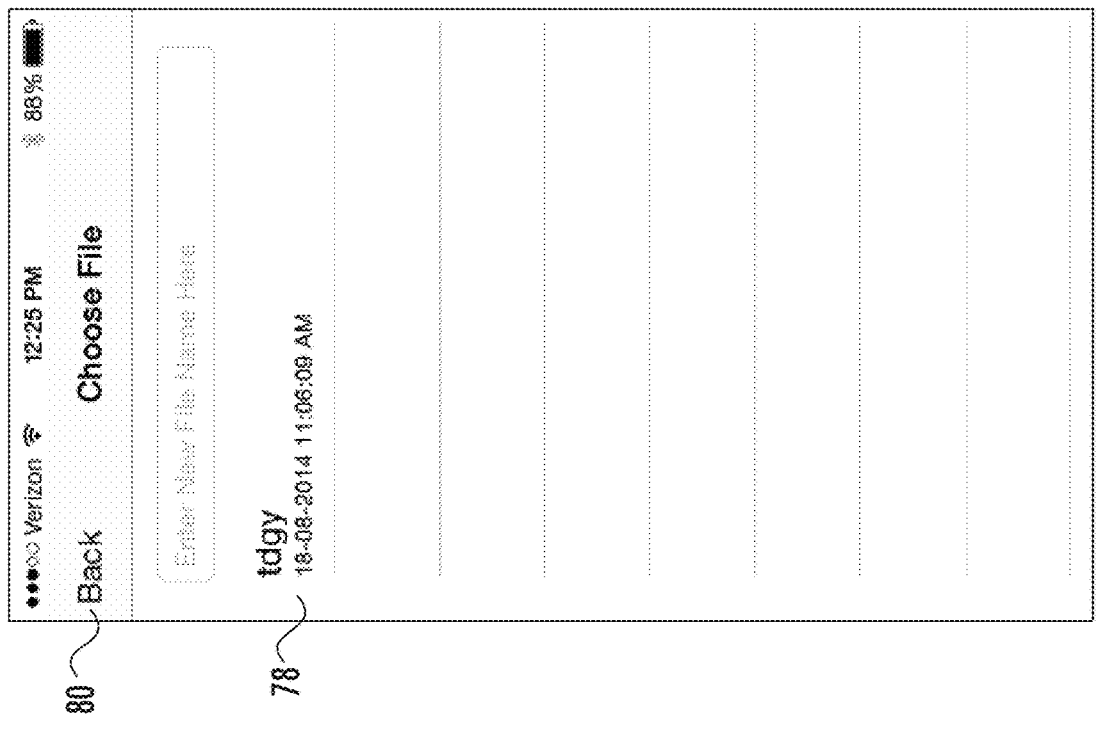
FIG. 4 a screenshot rendered by the inspection program where the user can select from existing project files.
Figure 3:
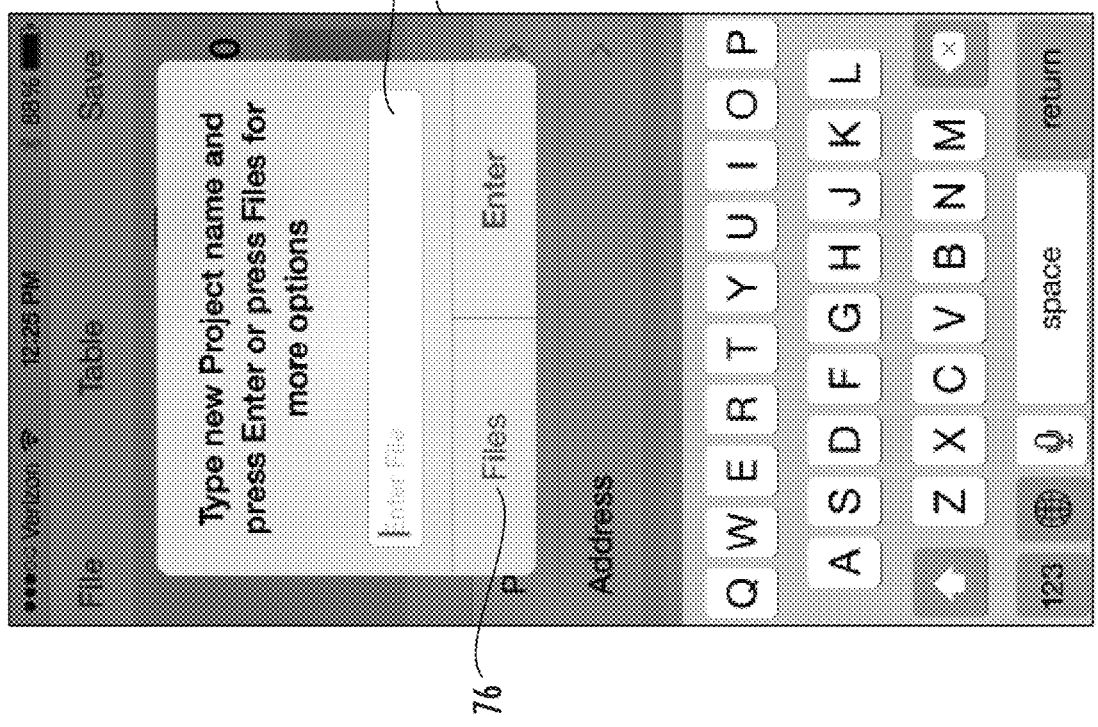
FIG. 3 is a screenshot rendered by the inspection program where a user can enter a new project filename or search existing project files.
Figures 5, 6:
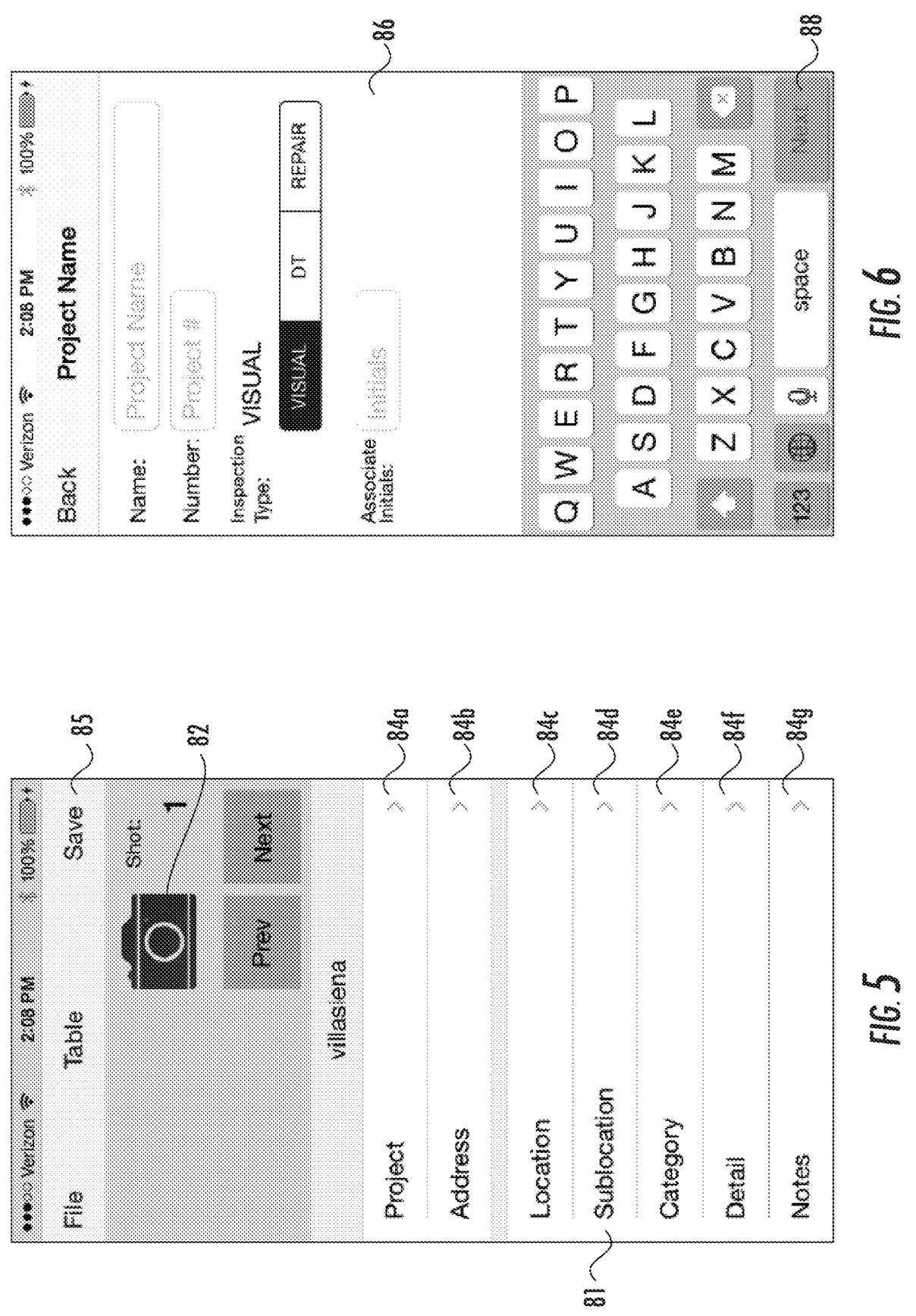

Referring now to FIG. 3, as the user opens the inspection program, the screen 72 provides the user with a choice of creating a new project file, browse existing project files, or manage files. The user can enter a file name in the box 74 then press enter to create a new project file. If the user chose to browse existing project files, the user can press files 76, and the screen in FIG. 4 that shows the existing files is shown to the user. Each filename 78 is displayed as well as the date and time the file was last accessed. Users may open a file by clicking on it, or click the back button 80 to return to screen 72. After the user creates a new file or selects a filename, the screen 81 in FIG. 5 is shown. The user may choose to click the camera icon 82 and take a photo or video, or begin inputting data by clicking on one of the drop down menus 84a-g.

Figure 8:
FIG. 8 is a screenshot rendered by the inspection program where the user can choose whether to retake or use the photo captured.
Figure 7:
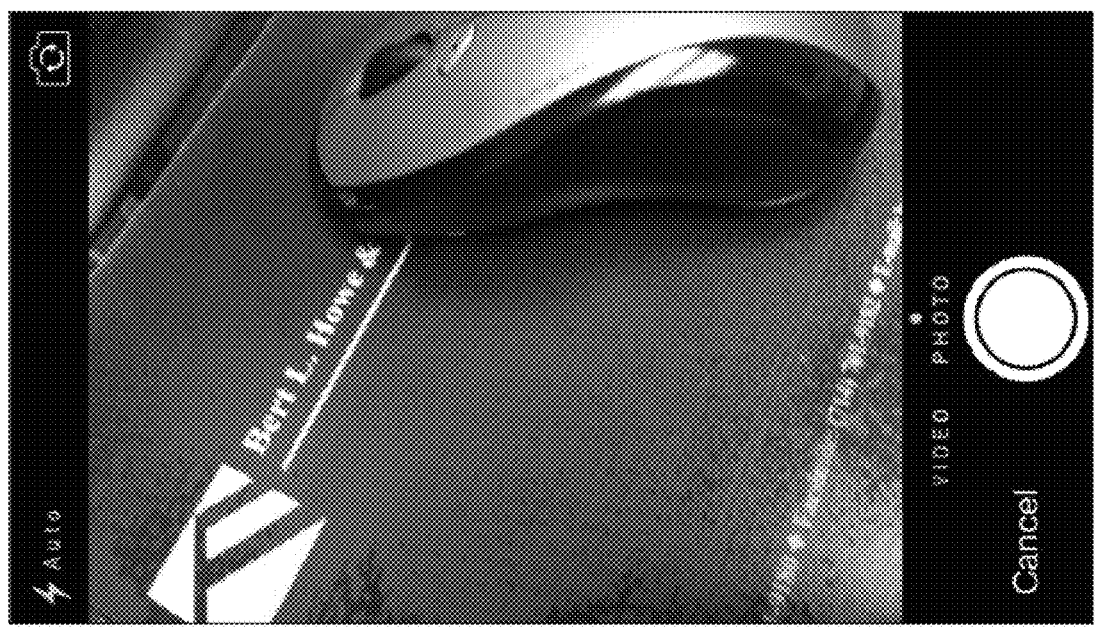
FIG. 7 is a screenshot rendered by the inspection program where the user can shoot a photo of an inspection location.
Figure 10:
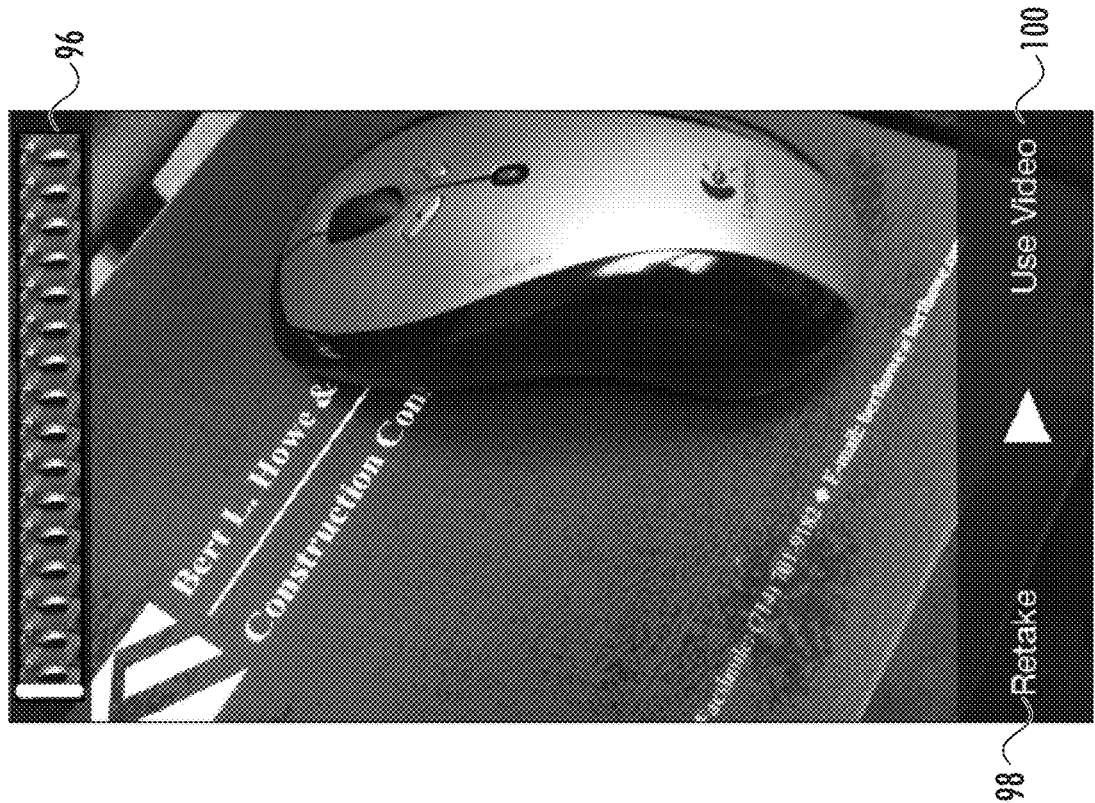
FIG. 10 is a screenshot rendered by the inspection program where the user can choose whether to retake or use the video captured.
Figure 9:
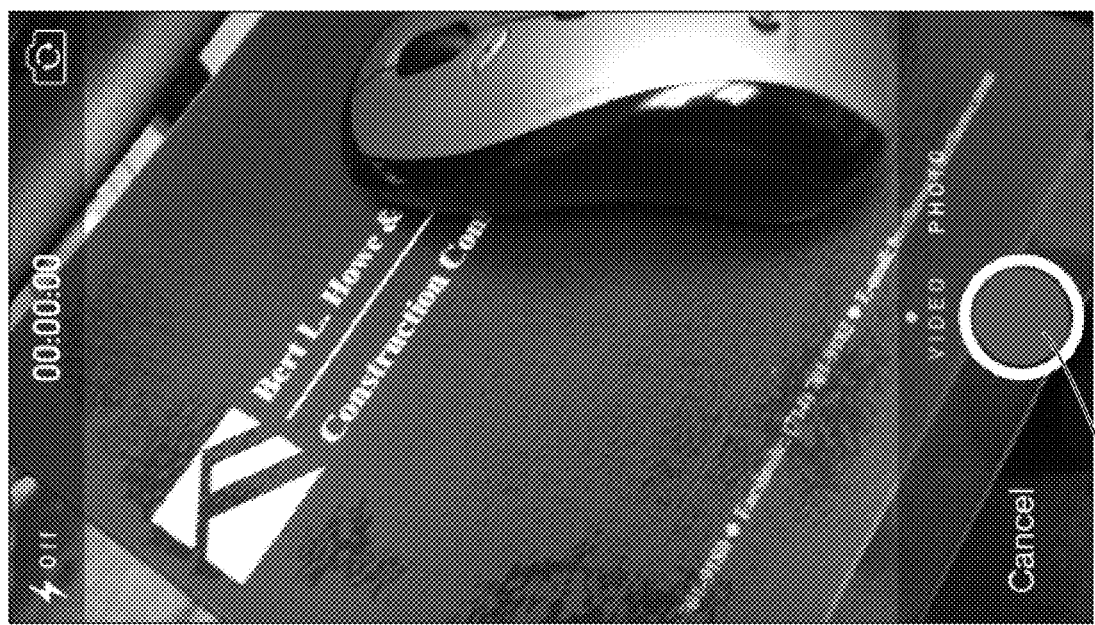
FIG. 9 is a screenshot rendered by the inspection program where the user can shoot a video of an inspection location.

If the user presses the project drop down menu 84a, the screen 86 shown in FIG. 6 will be displayed. Screen 86 will prompt the user to input the name of the project, a project reference number, choose the inspection type i.e. whether the inspection is related to Visual, DT, or Repair, and enter in the user's initials. Visual inspection is a type of inspection where inspectors are only taking photos and notes of what they can readily see. DT stands for Destructive Testing and is a type of inspection that is invasive and involves creating holes in the drywall and excavation during the inspection. Repair is a type of inspection where inspectors are taking photos and notes of the repair work that was done or that is currently on-going. When the user has provided all of the data, the "next" icon 88 on the bottom of the screen changes to "done." The user may click on "done" to return to screen 81 of FIG. 5. The user may click on the camera icon from screen 81, which will bring up the camera (FIG. 7). The default is photo, however, with a finger slide the user can switch to video. Once the photo button is pressed and a photo is taken, a preview 89 of the shot will be shown (FIG. 8) with the option of retaking the photo 90 or accepting the photo by clicking "Use Photo" 92. To take a video, the user simply clicks the video button 94 (FIG. 9), and presses the button again to stop it. A preview 96 of the first frame will be shown (FIG. 10) with the option of retaking the video 98 or accepting it by clicking "Use Video" 100.

Figure 11:
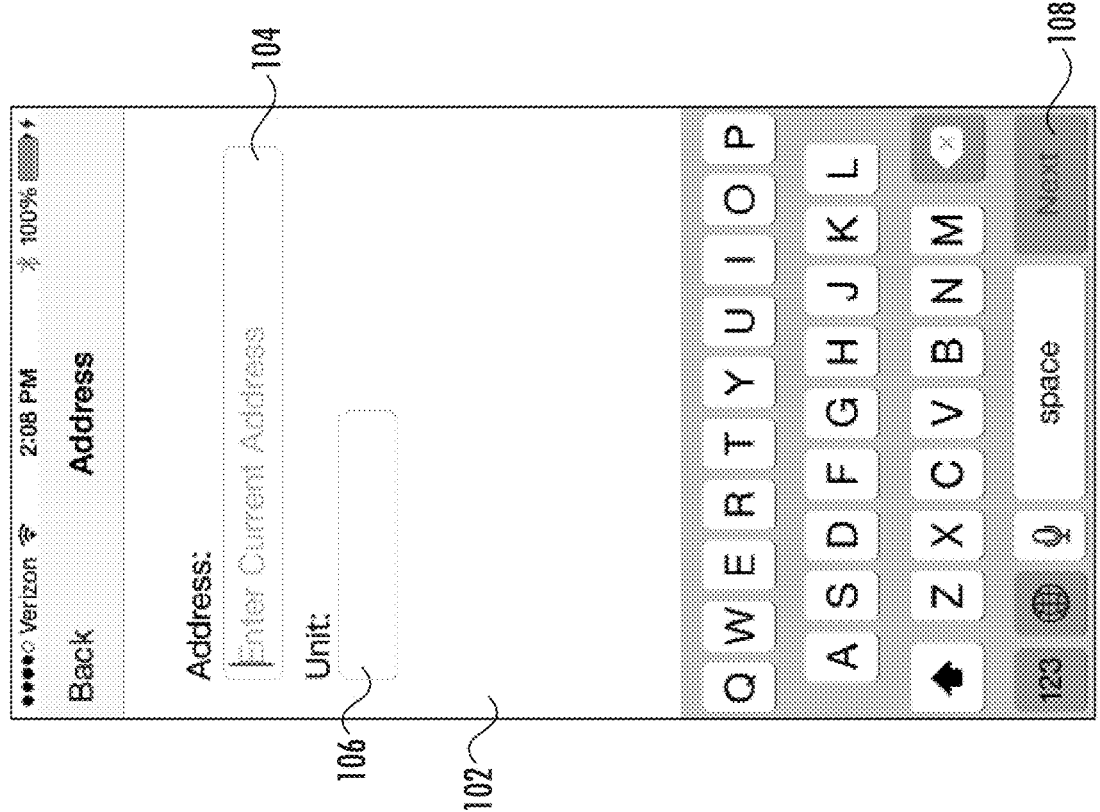
FIG. 11 is a screenshot rendered by the inspection program where the user can enter an address of the inspection location where the image was captured.

Referring back to FIG. 5, when a user clicks on the address drop down menu 84*b* from screen 81, the address screen 102 appears (FIG. 11). The system prompts the user to input an address into the address field 104. The user may or may not fill in the unit field 106. When the cursor is in the unit field 106, "next" 108 automatically changes to "done." A user clicks "done" to leave this menu and return to screen 81 (FIG. 5).

Figure 12:
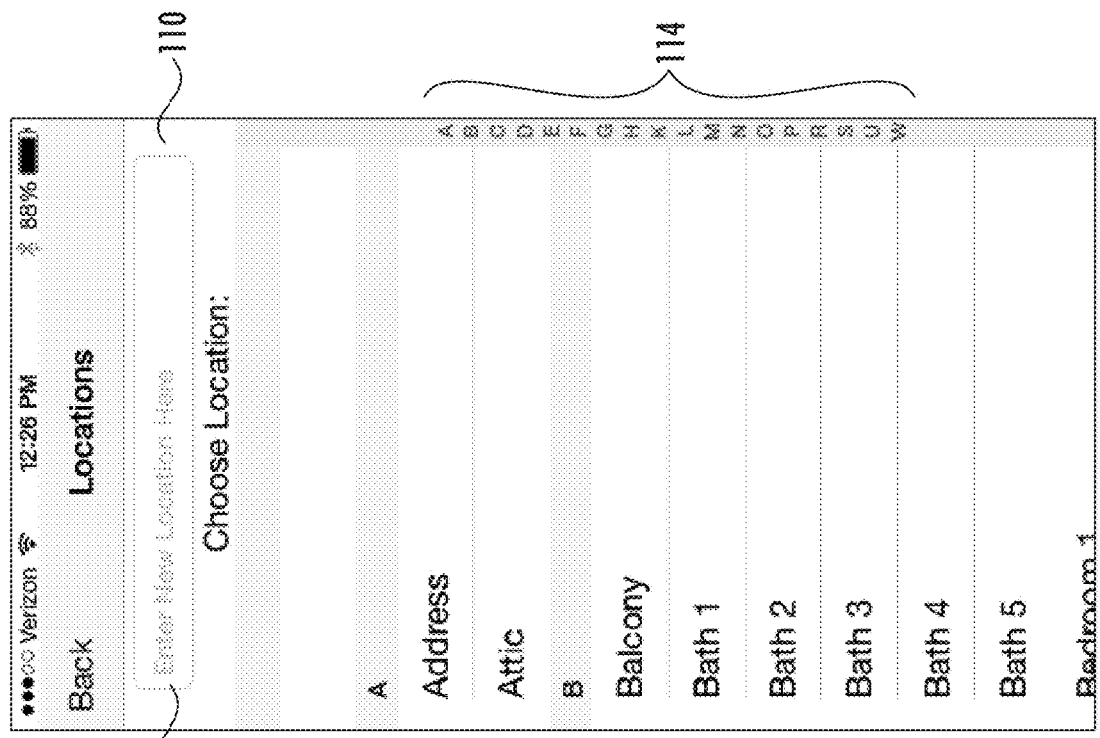
FIG. 12 is a screenshot rendered by the inspection program where the user can select a location from a list of locations.
Figure 13:
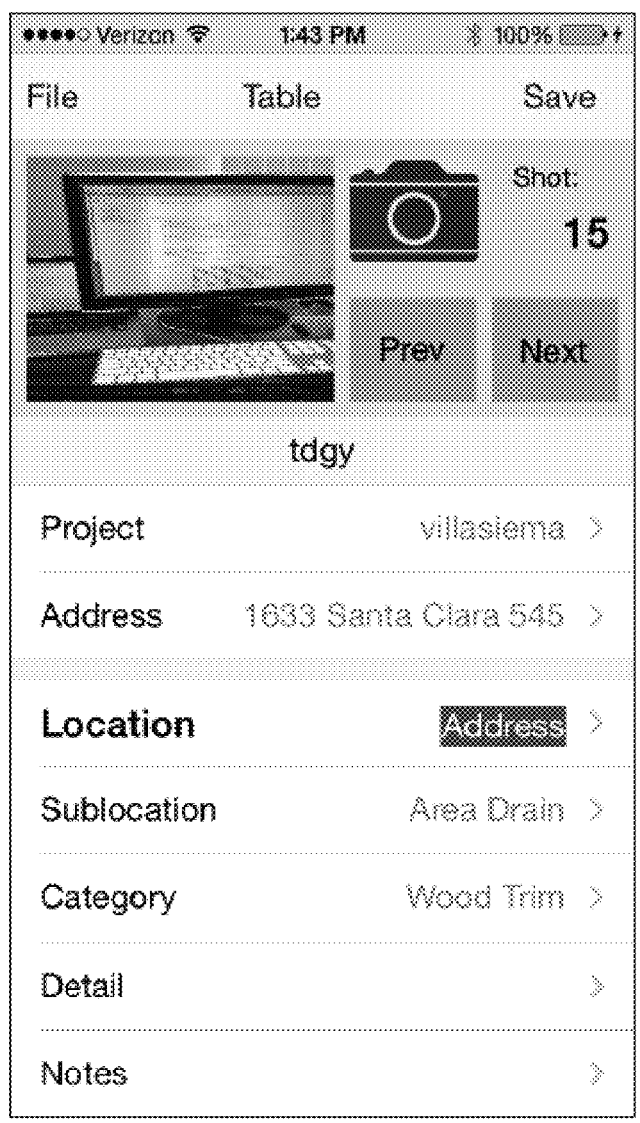
FIG. 13 is a screenshot rendered by the inspection program indicating to the user that the location field is locked.

The drop down menu below address 84*b* is location 84*c*. By clicking the location drop down menu 84*c*, the location screen 110 appears (FIG. 12). Users may scroll through the pre-existing list of locations 112 with their finger, or go directly to the first letter of a word by clicking on one of the letters 114 on the right hand side of the screen 110. If none of the existing locations are desired, a user may enter a new location on box 116. A user may choose to lock the location by either pressing or holding down the letters on the right hand side or holding down the location the user wishes to lock. When a Location is locked, it will be highlighted in red and the location field is bolded (FIG. 13). The locking feature allows the location that was entered to be automatically propagated in the location field each time a new photo is taken. When the user has taken all the necessary photos for the locked location and is ready to move on to the next location, the user can release the hold by choosing a different location.

Figure 14:
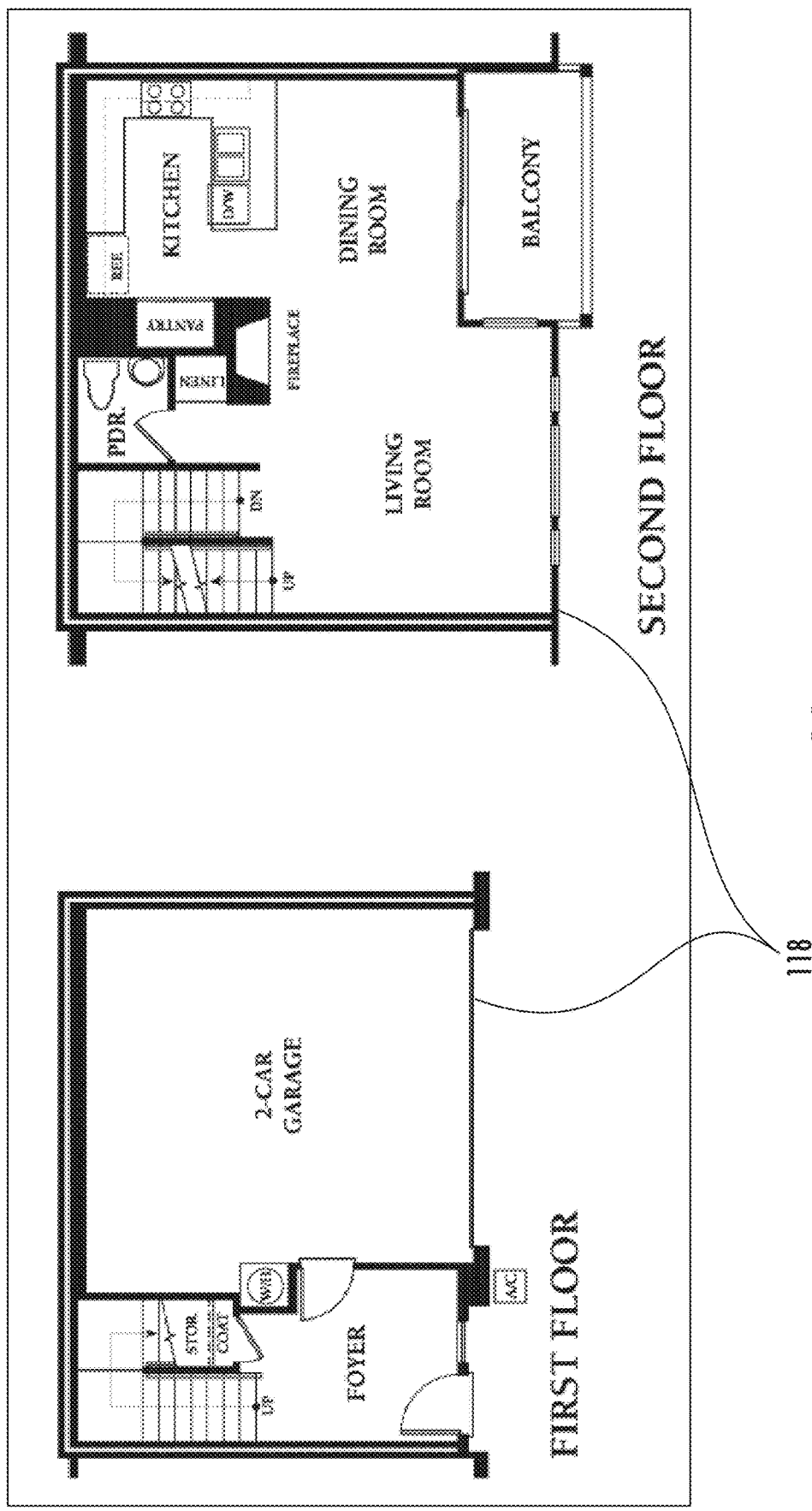
FIG. 14 is a screenshot rendered by the inspection program showing a floor plan that allows the user to select a location by touching an area of the floor plan.

A site map or floor plan 118 can be wirelessly uploaded to the file and used to select locations instead of the text list (FIG. 14). To use this feature, a user clicks on location as usual, and the site map or floor plan 118 will appear. The user can simply click on the appropriate location, which then inputs the relevant text (e.g. Bedroom 1 or Bath 2) into the location field. A chosen location turns the particular segment blue. If a user holds down a segment for longer than a second, then the location turns red signifying that it has been locked. When a user chooses a different location, the old location automatically unlocks.

Figure 16:
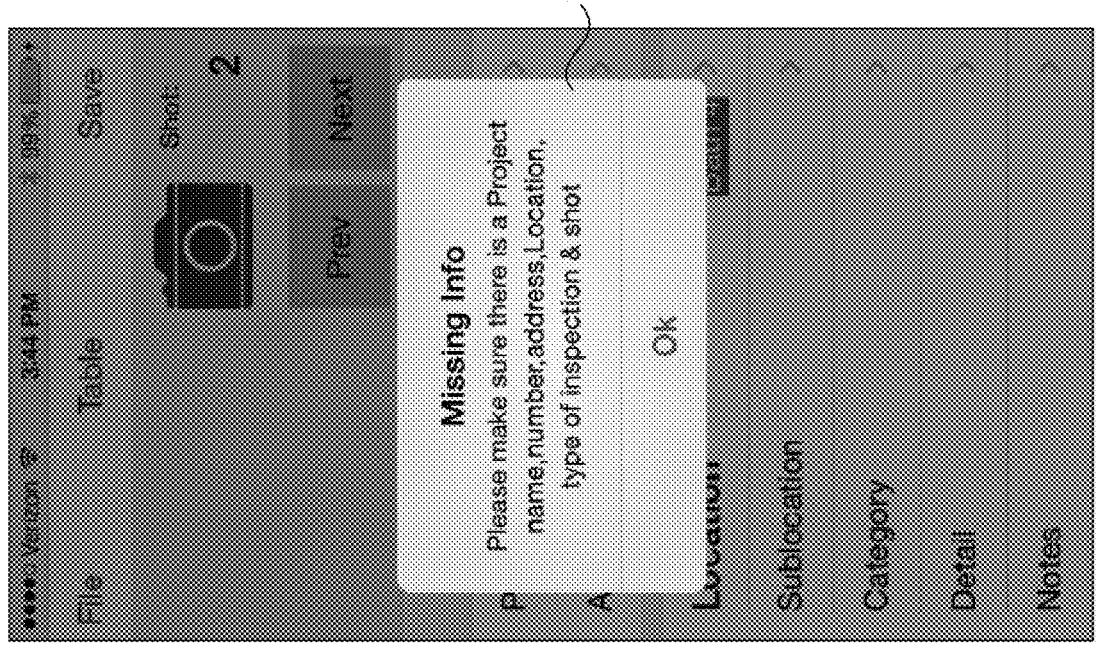
FIG. 16 is a screenshot of a warning window advising the user to input the required data.
Figure 15:
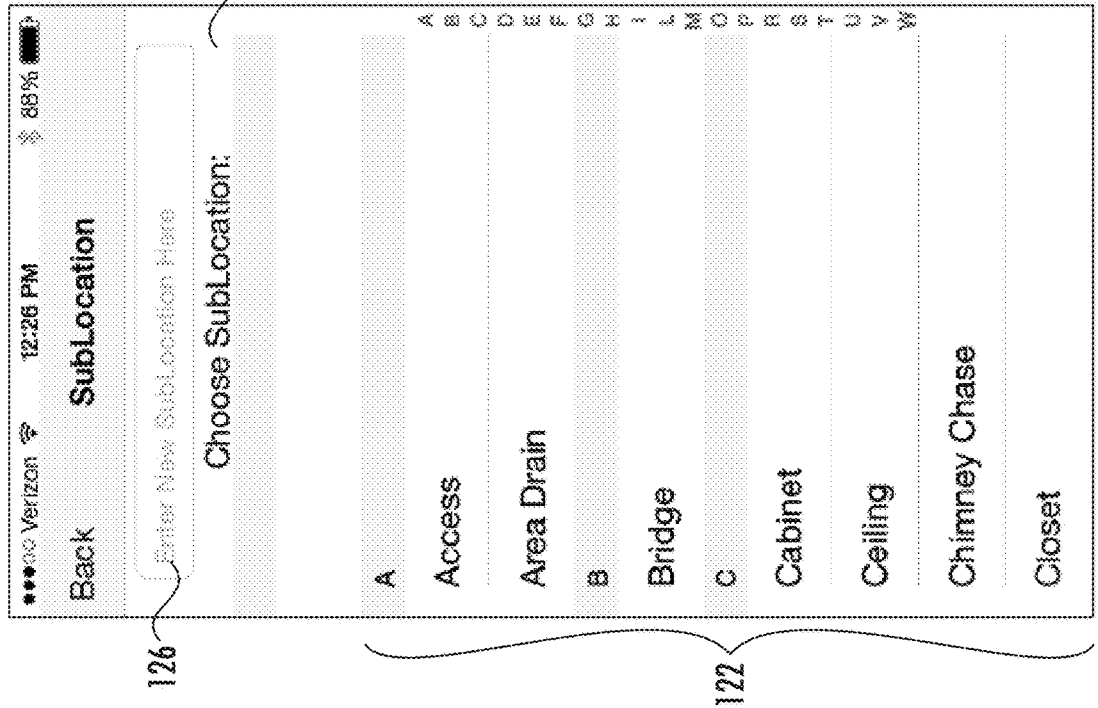
FIG. 15 is a screenshot rendered by the inspection program where the user can choose a sublocation from a list of sublocations.

Referring back to FIG. 5, when the sublocation drop down menu 84*d* is selected, the sublocation screen 120 (FIG. 15) is displayed. The sublocation screen 120 allows a user to choose a more specific location. For instance, if the user is taking photo of a kitchen, a sublocation might be cabinet. A user chooses from the list of sublocations 122 by finger scrolling or by jumping directly to the first letter of the word by clicking on one of the letters 124 on the right hand side. If none of the existing sublocations are desired, a user may enter a new sublocation on box 126. As long as project, address, and location data has been entered, the user may click "next" to record a new image. Entering sublocation, category, detail, and notes may be programmed to be optional. However, if a user attempts to record a new image without entering in the project, address, and location data, a warning window 128 will appear advising the user to input the required data and it will prevent the user from recording the next image (FIG. 16). The display of the warning window 128 is controlled by a field manager program that is stored in the memory and executed by the processor.

Figure 18:
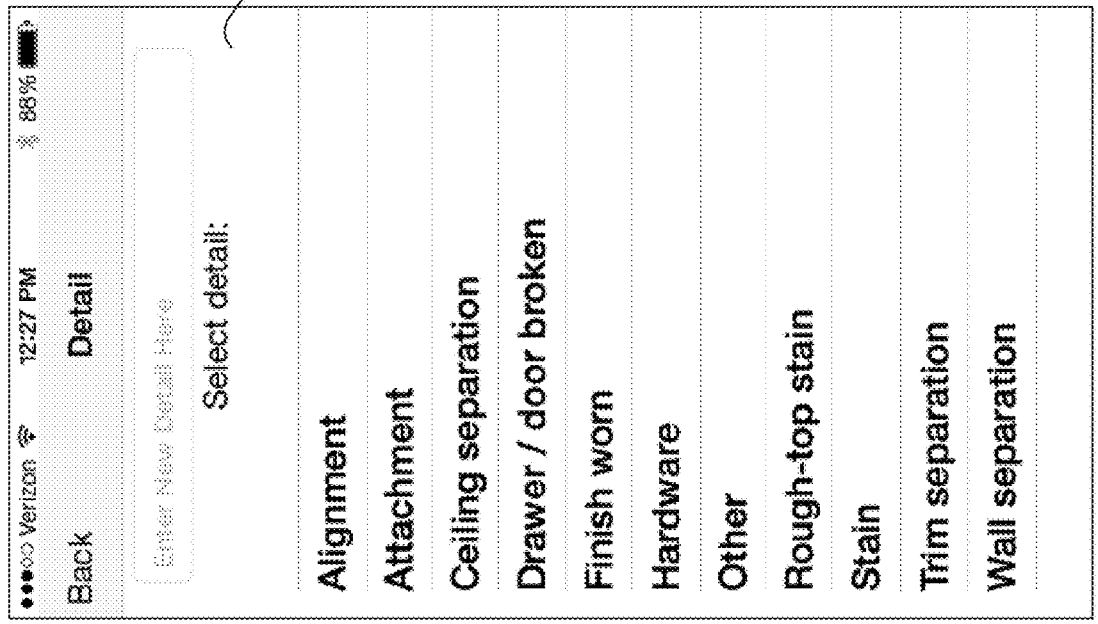
FIG. 18 is a screenshot of a detail screen.
Figure 17:
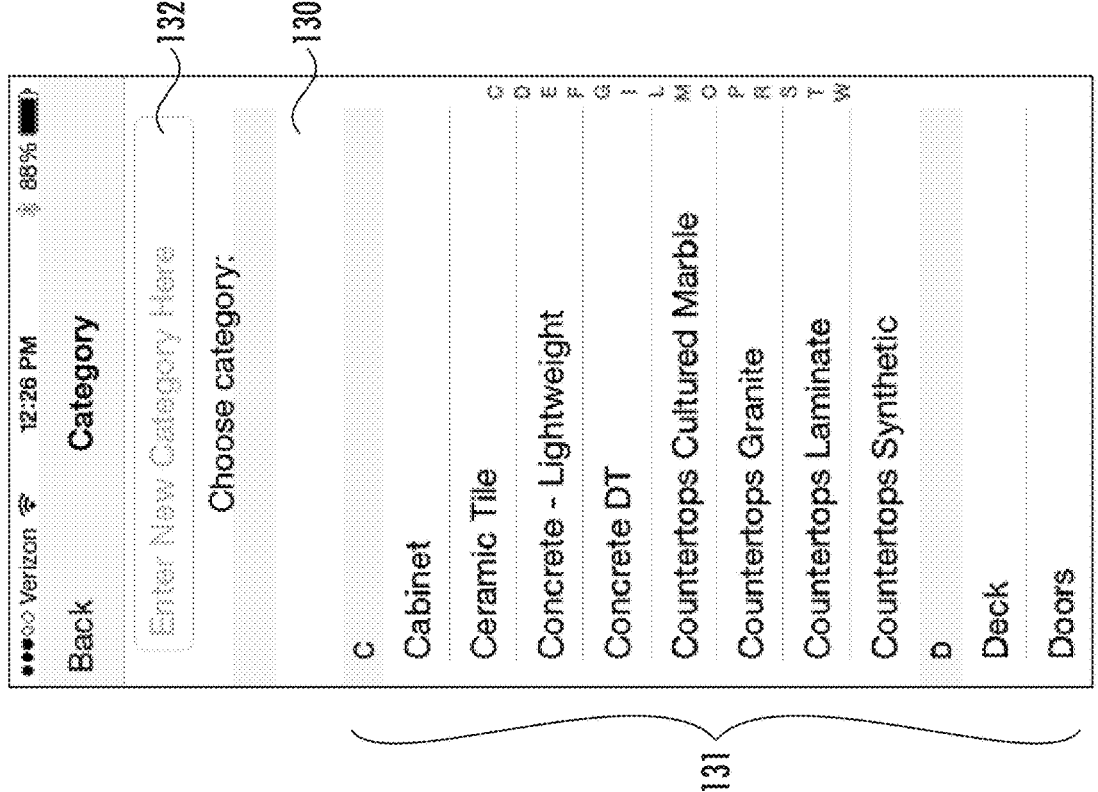
FIG. 17 is a screenshot of a category screen.

Referring back to FIG. 5, another drop down menu is the category drop down menu 84*e*. The category drop down menu 84*e* is related with the detail field 84*f*. When the category drop down menu 84*e* is selected, category screen 130 is displayed (FIG. 17). The user first selects a category from the list of categories 131 in the category screen 130 or enters a new category in box 132, if none of the listed categories are desired. Next, the detail screen 134 pertaining to the selected category appears (FIG. 18). The detail screen that appears changes depending on the category that is selected. For instance, if a user selects cabinet as the category, then when detail field 84*f* is clicked, a special detail list 136 that is particular to cabinetry appears. A new detail can be added as well.

Figures 19, 20:
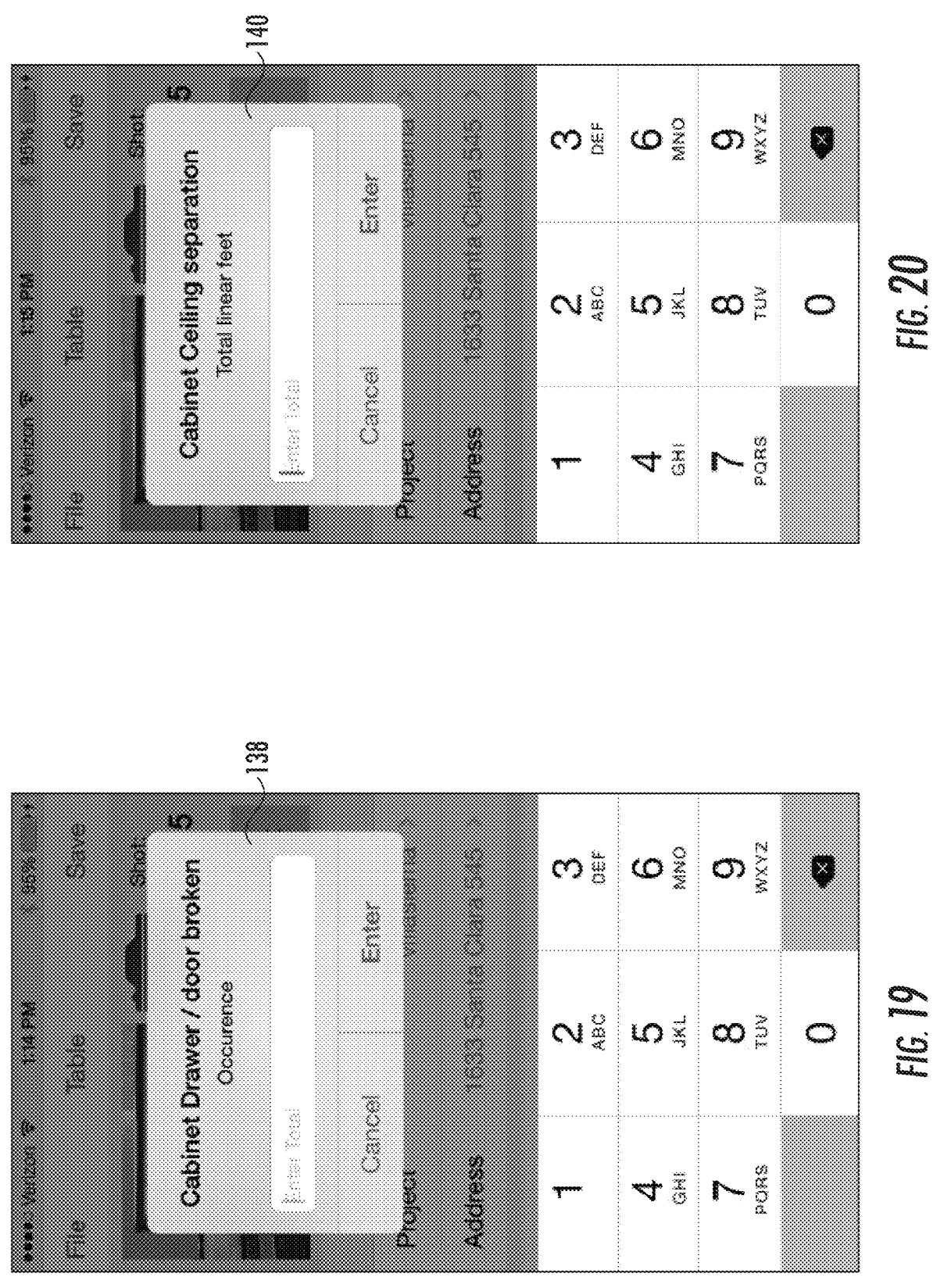
Figure 21:
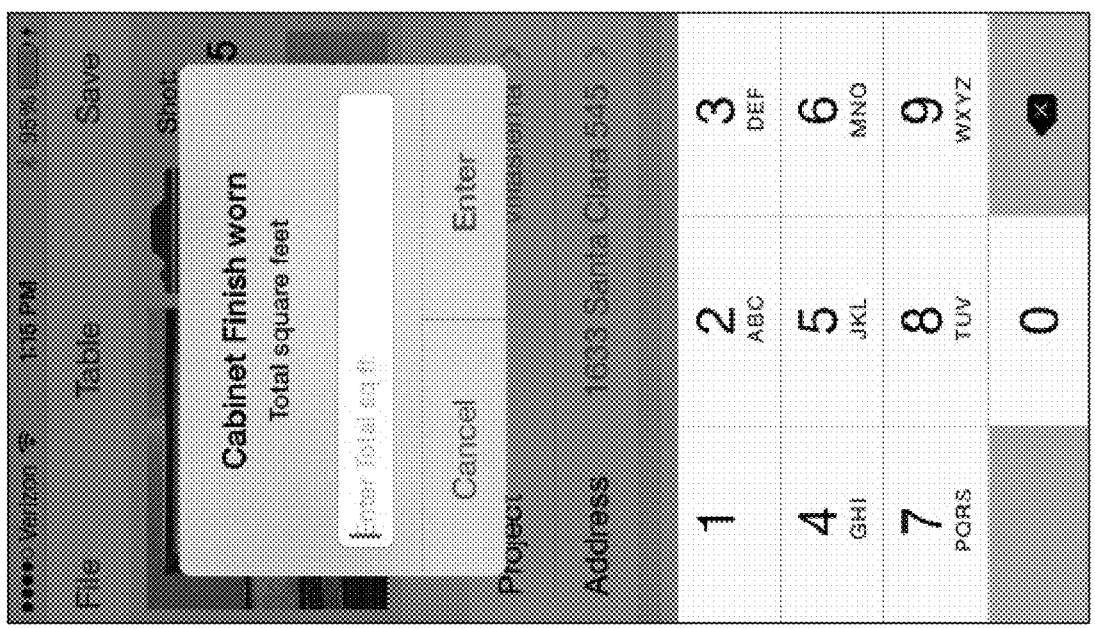
FIG. 21 is a screenshot where a user can enter the size of the wear of a cabinet finish.

Occasionally, more specific data is desired. In that case, a sub-view will appear requiring the user to input additional information. There are different sub-view designs based upon what type of information is necessary. For instance, if a user selects the cabinet category, and then selects the cabinet drawer/door broken detail, a sub-view 138 appears (FIG. 19) prompting the user to input the number of occurrences the cabinet drawer or door is broken, or how many cabinet drawers are broken. If the user selects cabinet ceiling separation as the detail, then the sub-view 140 will ask how many total linear feet (FIG. 20) does the ceiling separation measure. If the user selected cabinet finish worn as the detail, the user would be prompted to input the size of the wear in total square feet (FIG. 21).

Figure 22:
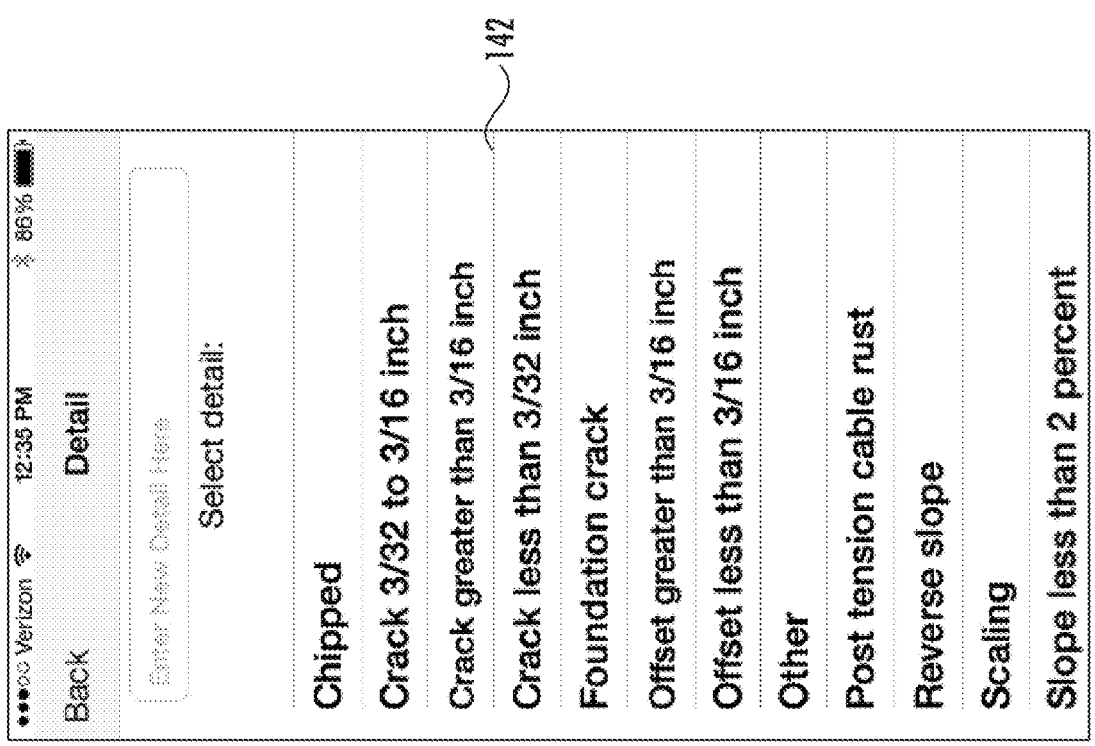
FIG. 22 is a screenshot of a detail screen for a slab foundation.
Figure 23:
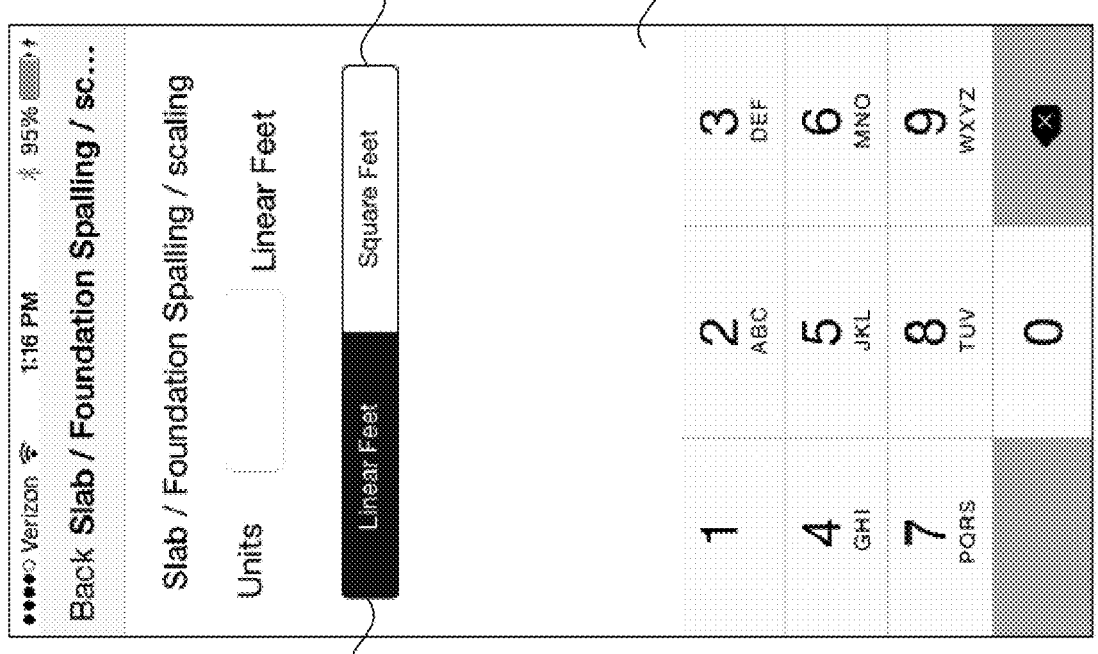
FIG. 23 is a screenshot of a detail screen for spalling and scaling.

Another sample category is slab foundation, which like every other category has its own unique detail screen 142 (FIG. 22). If the user chooses the spalling/scaling detail, then another sub-view 144 appears (FIG. 23), prompting additional information. The user is prompted to select between two units of measurement—linear feet 146 or square feet 148. With a finger slide, the user can choose the appropriate measurement unit based upon the particular situation.

Figure 24:
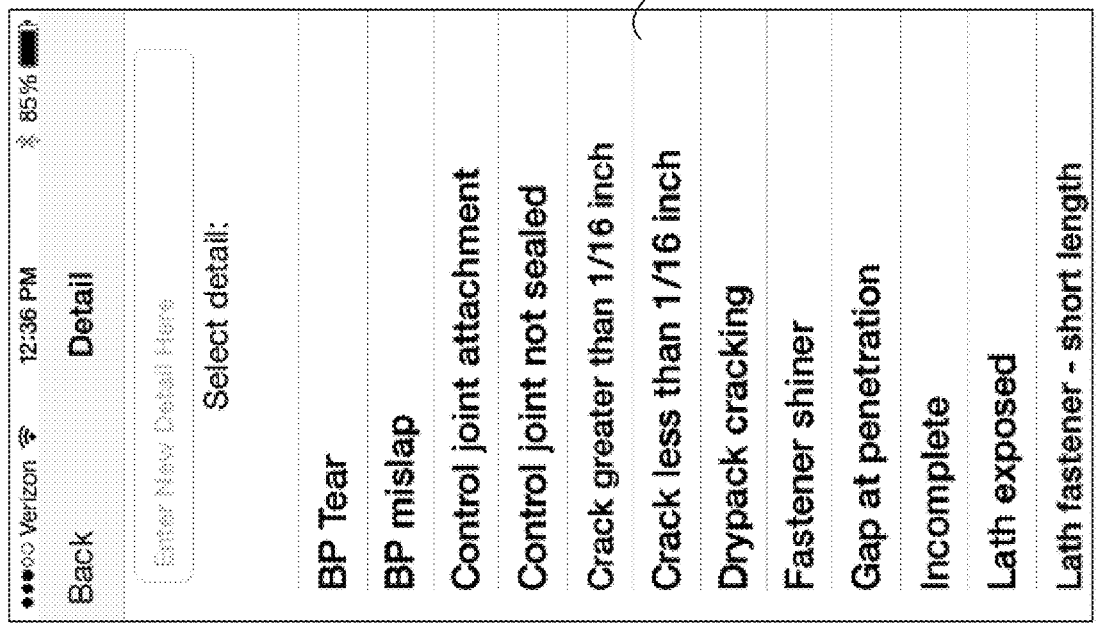
FIG. 24 is a screenshot of a detail screen for stucco.
Figure 26:
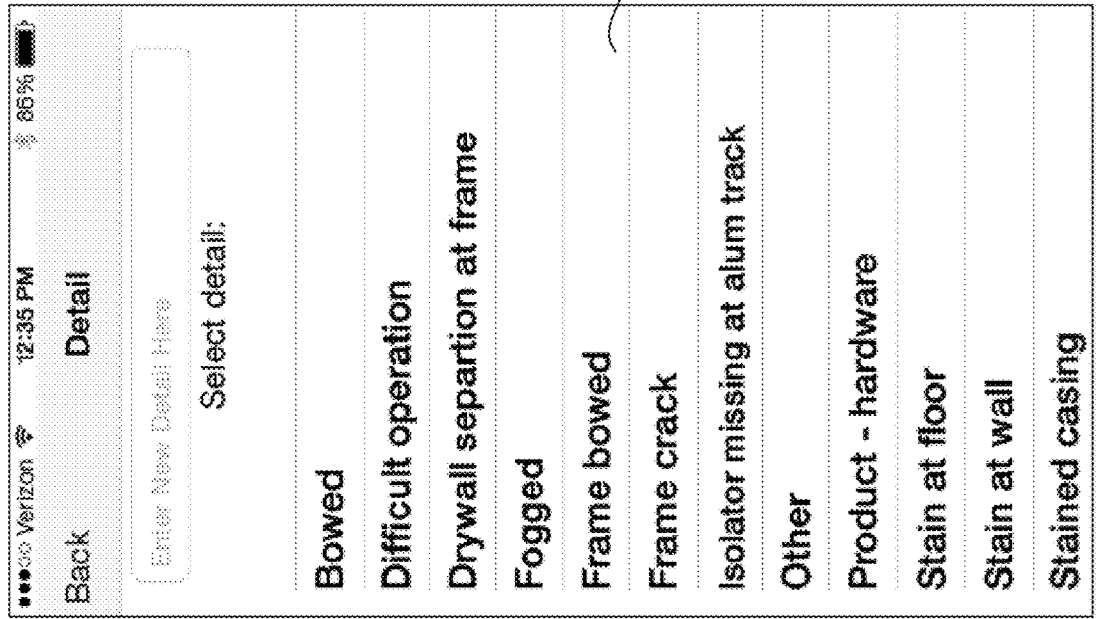
FIG. 26 is a screenshot of a detail screen for a sliding glass door.
Figure 25:
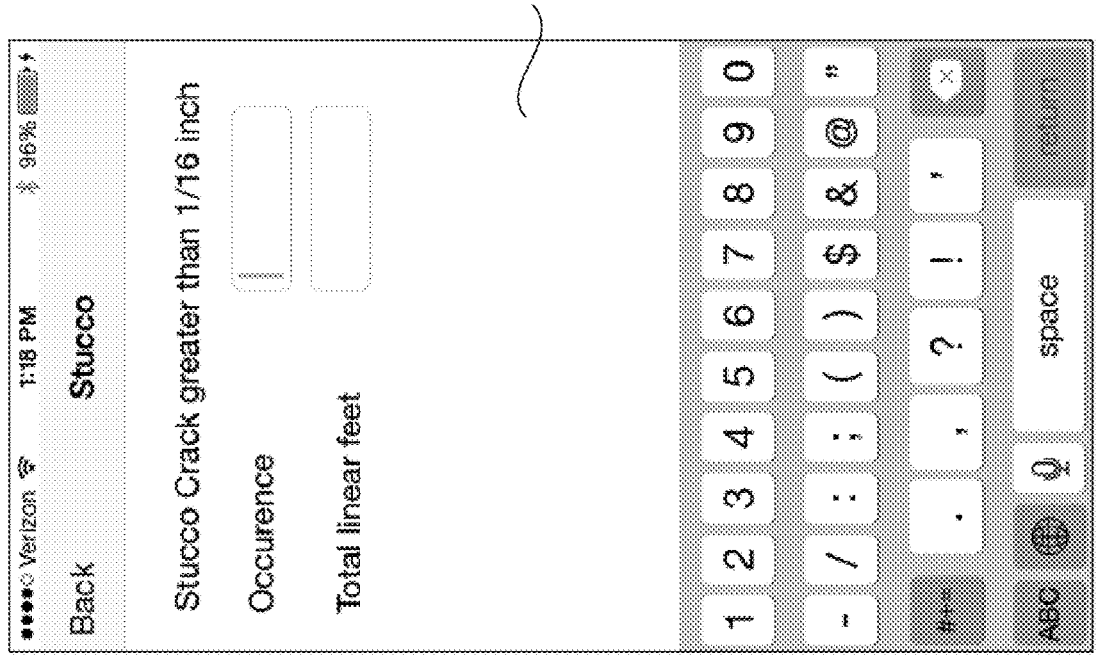
FIG. 25 is a screenshot where a user can enter the number of occurrence of the specified detail of the stucco and the measurement of the detail.
Figures 27, 28:
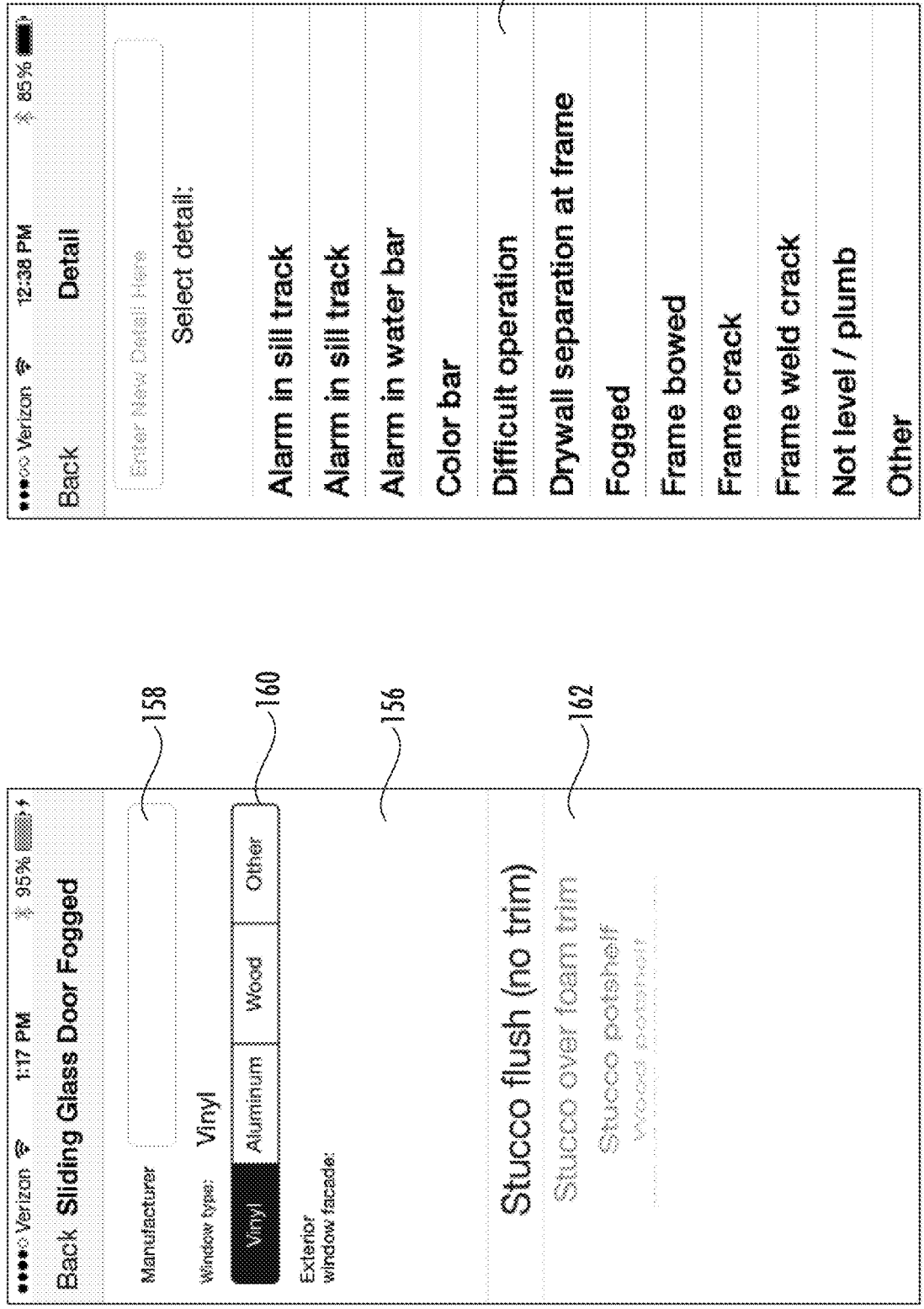
FIG. 27 is a screenshot of a subview screen for sliding glass doors.
FIG. 28 is a screenshot of a detail screen for windows.

The Stucco Category's Detail menu (FIG. 24) is another example of a unique list of items that occasionally needs additional data input. For instance, say the user selects the detail "crack greater than $\frac{1}{16}$ inch" 150. The user can easily type in the occurrence and total linear feet in screen 152 (FIG. 25). Additional data may not always be a matter of occurrences or measurements. For instance, if "fogged" is chosen from the sliding glass door detail screen 154 (FIG. 26), then a sub-view 156 appears that may ask for the manufacturer, window type, and the type of exterior window facade (FIG. 27). This particular sub-view demonstrates the flexibility of the menu design elements. The user types the manufacturer into box 158; the window type is chosen by sliding the finger over Vinyl, Aluminum, Wood, or Other selection 160; and the Exterior window facade is a scrollable menu 162.

Figure 30:
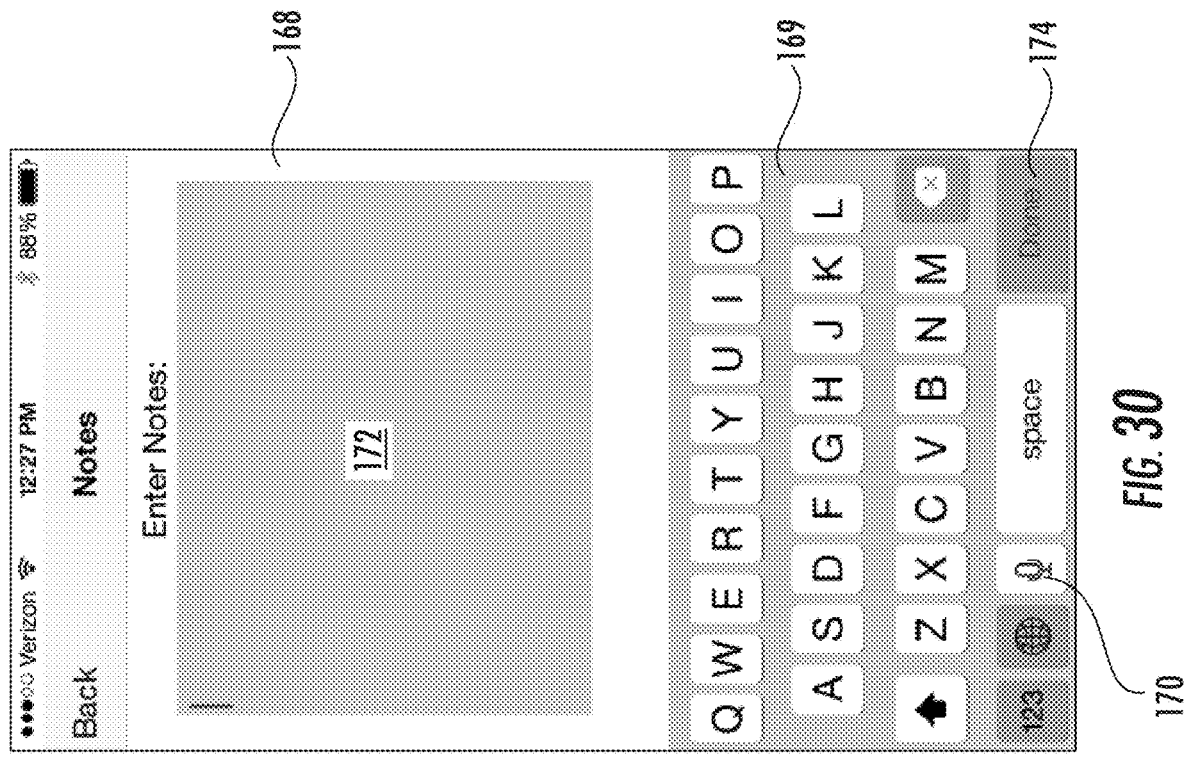
FIG. 30 is a screenshot of a notes screen.
Figure 29:
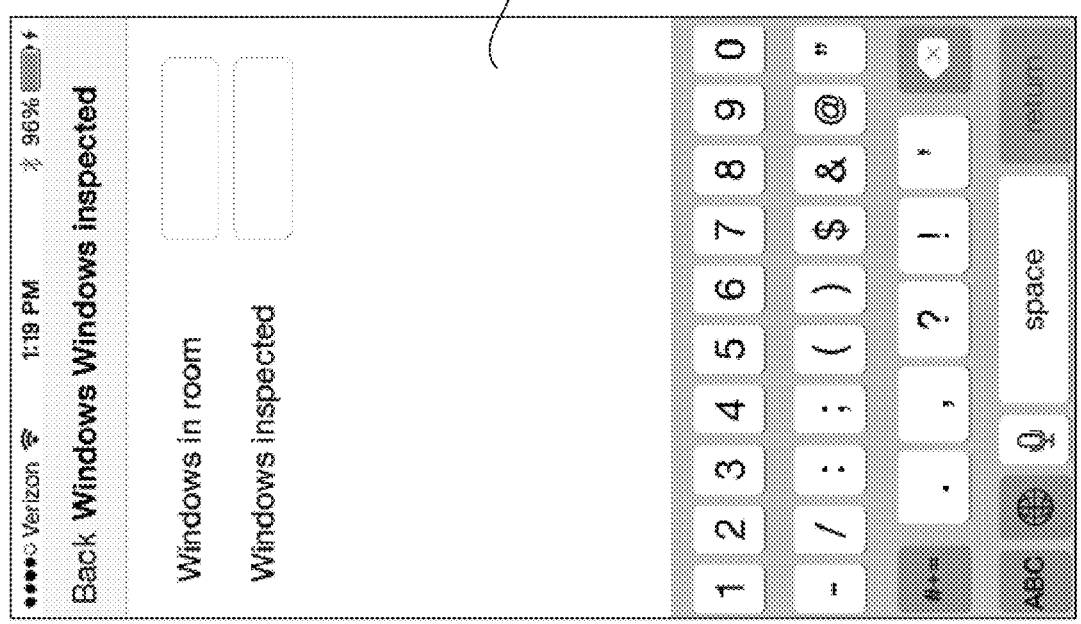
FIG. 29 is a screenshot of a screen where the user may be prompted to input the number of windows in the location and the number of windows inspected.

FIG. 28 shows the detail screen for windows 164. After the user selects a window condition, the user is shown screen 166 (FIG. 29) where the user may be prompted to input the number of windows in the location as well as the number of windows inspected. Referring now to FIG. 30, the next field, notes, is available for situations where a notation needs to be made but does not fit into any of the standard fields. When the user clicks notes 84*g* from screen 81 (FIG. 5), the Notes view 168 appears (FIG. 30). The user can either type notes using the touch keyboard 169 or can choose to click the microphone icon 170 and speak into the phone, which will then translate the sound into text. The text appears in the grey box 172, which allows the user to edit, if necessary, before clicking "done" 174.

Once a user has taken a photo or video and entered all of the data from the various fields 84*a-g*, the user clicks next to save the data. It also returns the user to the screen 81 (FIG.

Figures 31, 32:
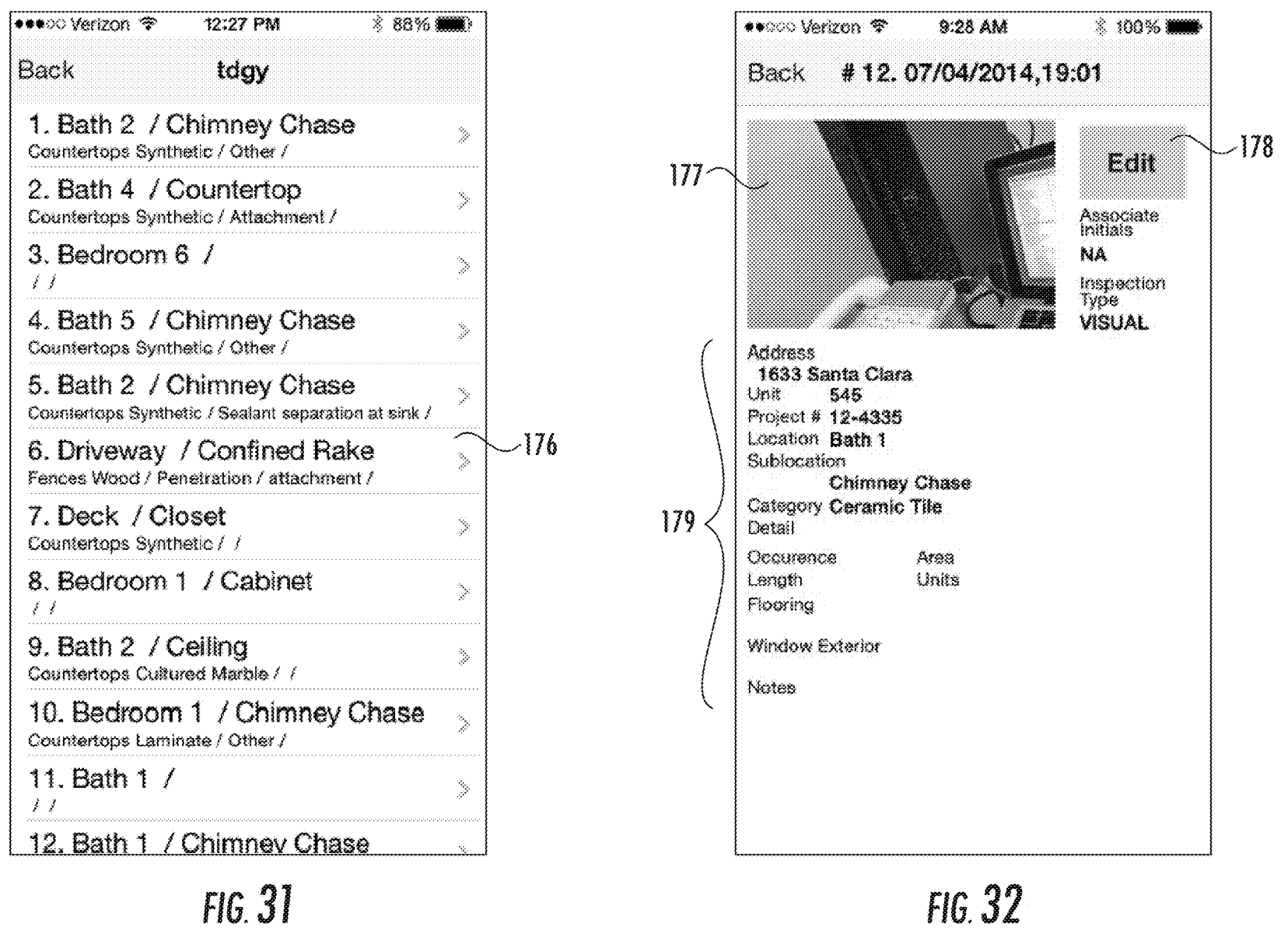

5), with the Project and Address fields automatically populated, and the previous location and sublocation selections automatically appearing at the top of the list. If a location has been locked, then the list will be populated. At any time, a user can click table, which changes the view to a scrollable, text-only list 176 of the information gathered so far (FIG. 31), specifically the location, sublocation, category and detail of each recorded image. As a user progresses with multiple image records, perhaps even hundreds in one file, it can be useful to change to the table view to find a particular image. To view more details of that image, the user simply clicks on it, and a new view appears (FIG. 32) displaying a photo or video thumbnail 177 with data from all fields 179. Users can click edit 178, which will open the image in the main screen 81 and allow them to make changes (FIG. 5).

Figure 33:
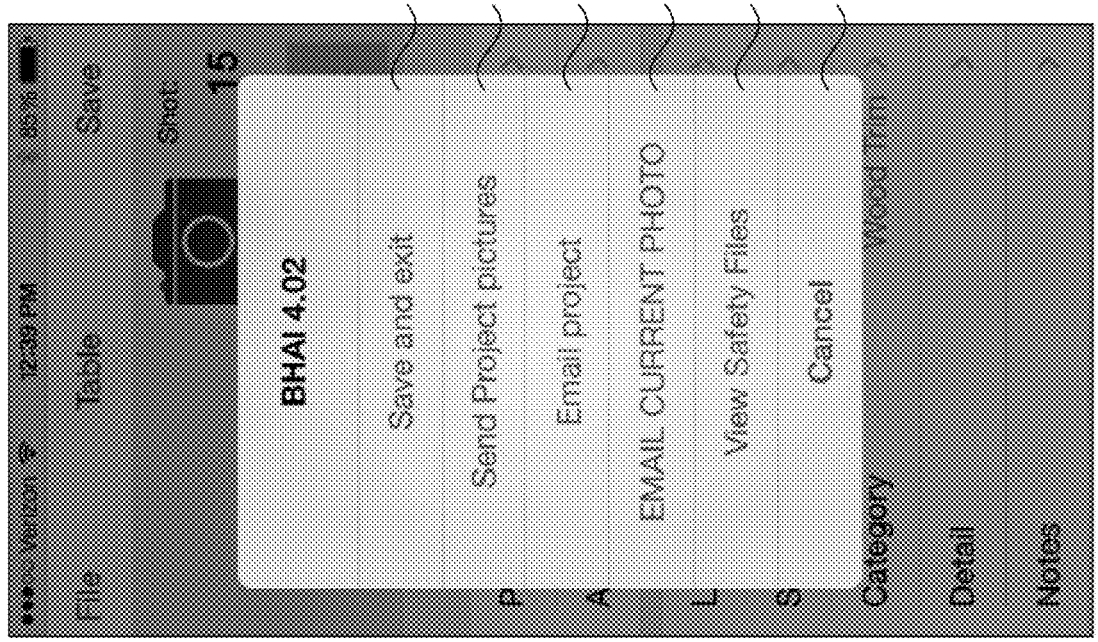
FIG. 33 is a screenshot of a screen showing several project options for a user to select.

From the main screen 81 (FIG. 5), when a user selects "save" 85, a new view appears (FIG. 33). The Save view provides different options. The user can click "Cancel" 171 to go back to the main screen 81. "Save and exit" 180 will close the inspection program. The program automatically saves every time Next is clicked. "Send Project pictures" 182 will start the upload process of the photos, videos, and data to a webserver. If at any time the user needs to cancel the process or is disconnected from the Internet, the program will remember the last image that was successfully transmitted and will automatically begin at the next image when the user returns to the menu item later. When all of the data has been uploaded, a view will appear stating "Done Sending." "Email project" 184 will send data preferably only in a text document to a particular email address. If a user feels that a particular shot needs to be analyzed by the office immediately, the user can select "Email Current Photo" 186, which will email the data along with the photo or video to a particular email address. The contents of the email are preferably encrypted for security.

Figure 34:
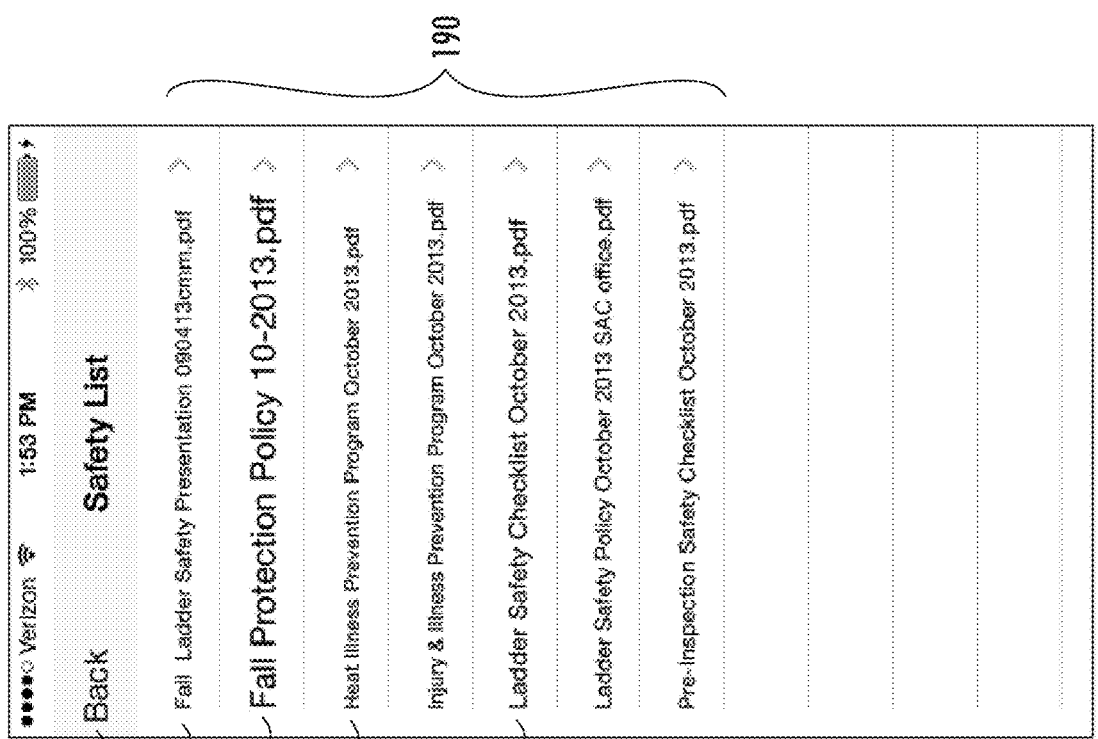
FIG. 34 is a screenshot of reference files available for the user to view.
Figure 35:
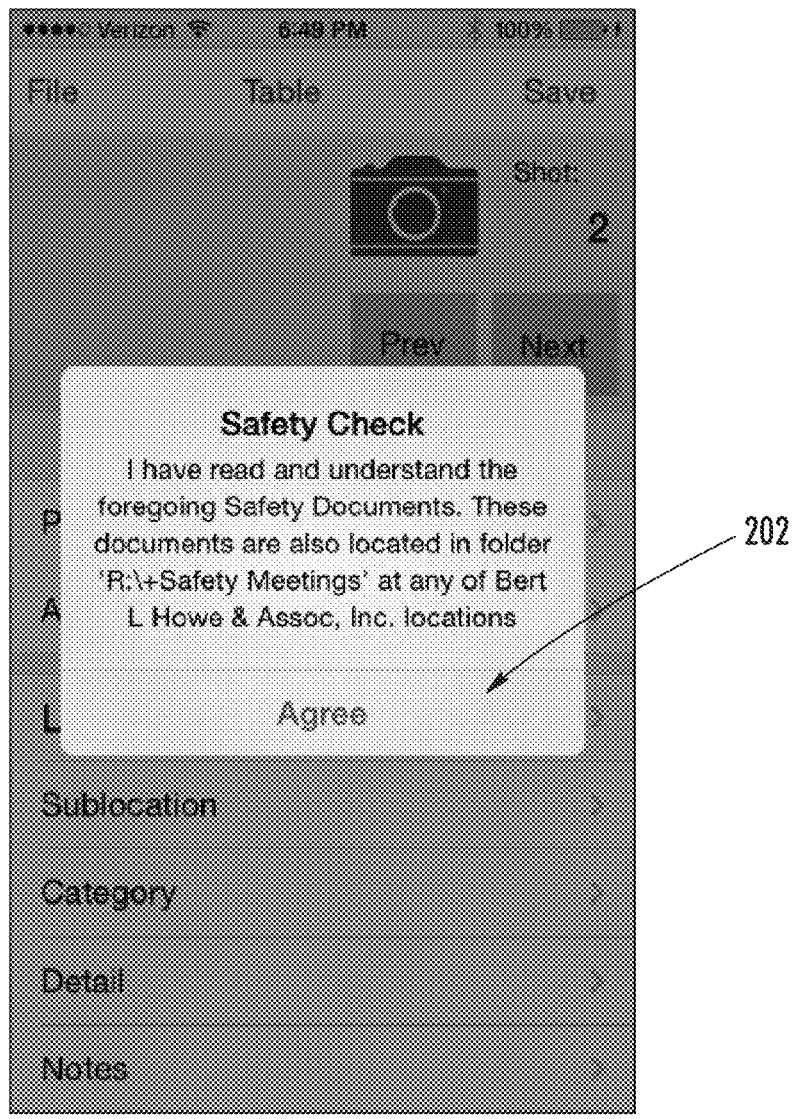
FIG. 35 is a screenshot of an agreement screen.

The "view safety files" option 188 brings up a list of reference files 190 available to be viewed within the program as shown in FIG. 34. The list of reference files can be a checklist, a presentation, or a written policy. The list, for instance, includes a ladder safety inspection 192, a fall protection policy 194, a heat illness prevention program 196, and a ladder safety checklist 198. The examples of files 190 shown in FIG. 34 are all related to employee safety standards. However, the option is also useful for any resources that the user may need as reference, such as a schedule, a floor plan, a site plan, a checklist, cost of repair, or other relevant documentation. These PDFs are wirelessly uploaded and updated. The user can simply click on a file to view it. It can be appreciated that the program can distribute a presentation, for instance, in this case on Personal Safety, to users wirelessly and viewed completely within the inspection system of the present disclosure. Not only can the inspection system distribute PDF documentation wirelessly and easily, it also transmits a notification when the documentation has been read. After a user closes a PDF and clicks the back icon 200 in FIG. 34, an agreement screen 202 will appear that requires the user to click Agree (FIG. 35). This information is transmitted wirelessly to a webserver for recordkeeping.

The inspection system has several file management features. For instance, the user can type "bhamanagefiles" into box 74 of FIG. 4 to delete project files that are no longer needed. A Delete Files window appears, which displays only the files that have been fully uploaded to the webserver. If for some reason a user wishes to delete a file that has not been fully uploaded (for instance, it is a test file or training), then the user can input the entire file name to delete the file. The user can also type "bhasend" into box 74 to send project files. An email screen will appear for the user. The user can also type "bhaget" into box 74 to retrieve a known project file. A screen appears asking for an access code before providing the user with the project file.

Figure 36:
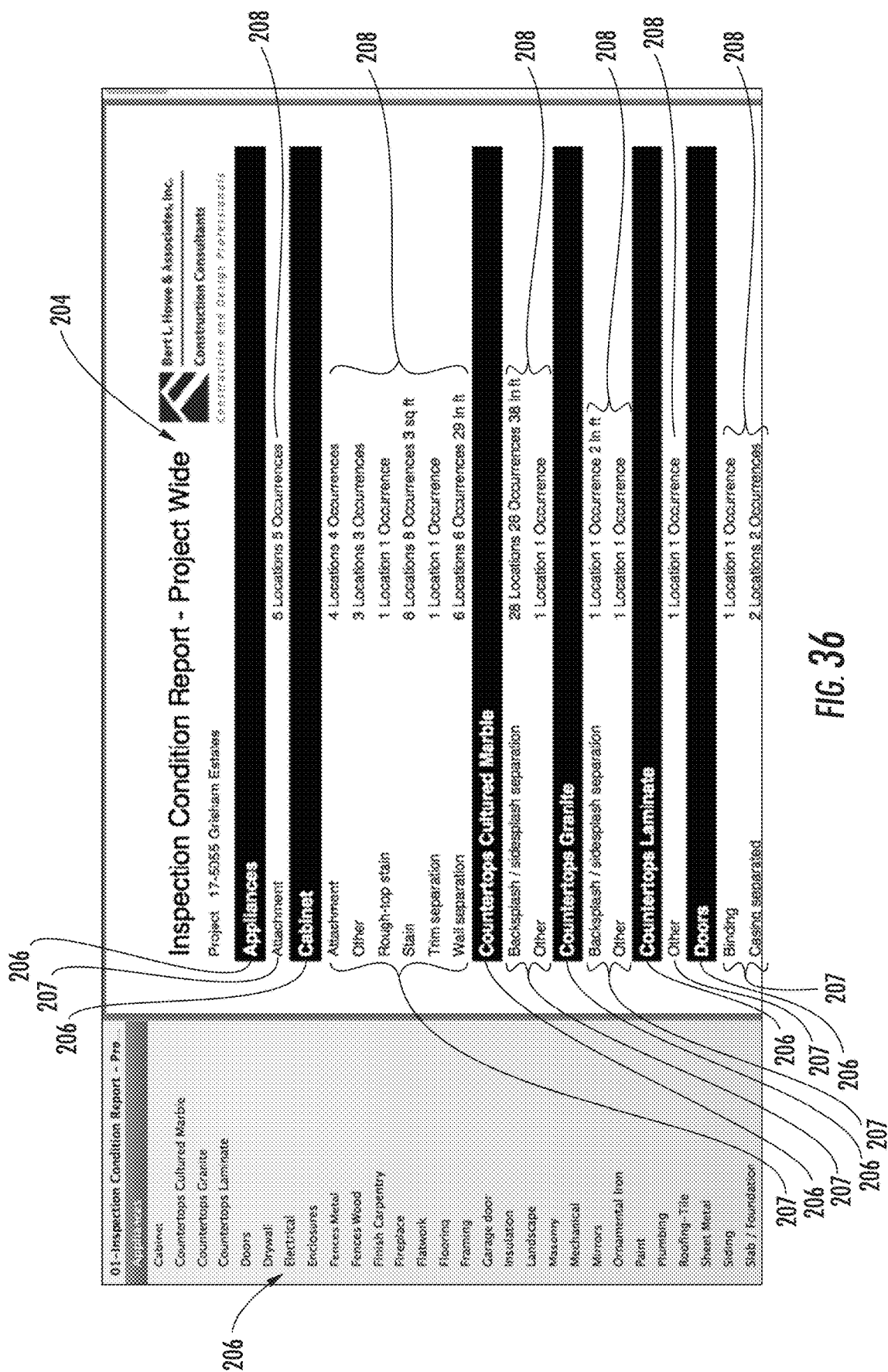
FIG. 36 is a screenshot of a formatted report.
Figure 37:
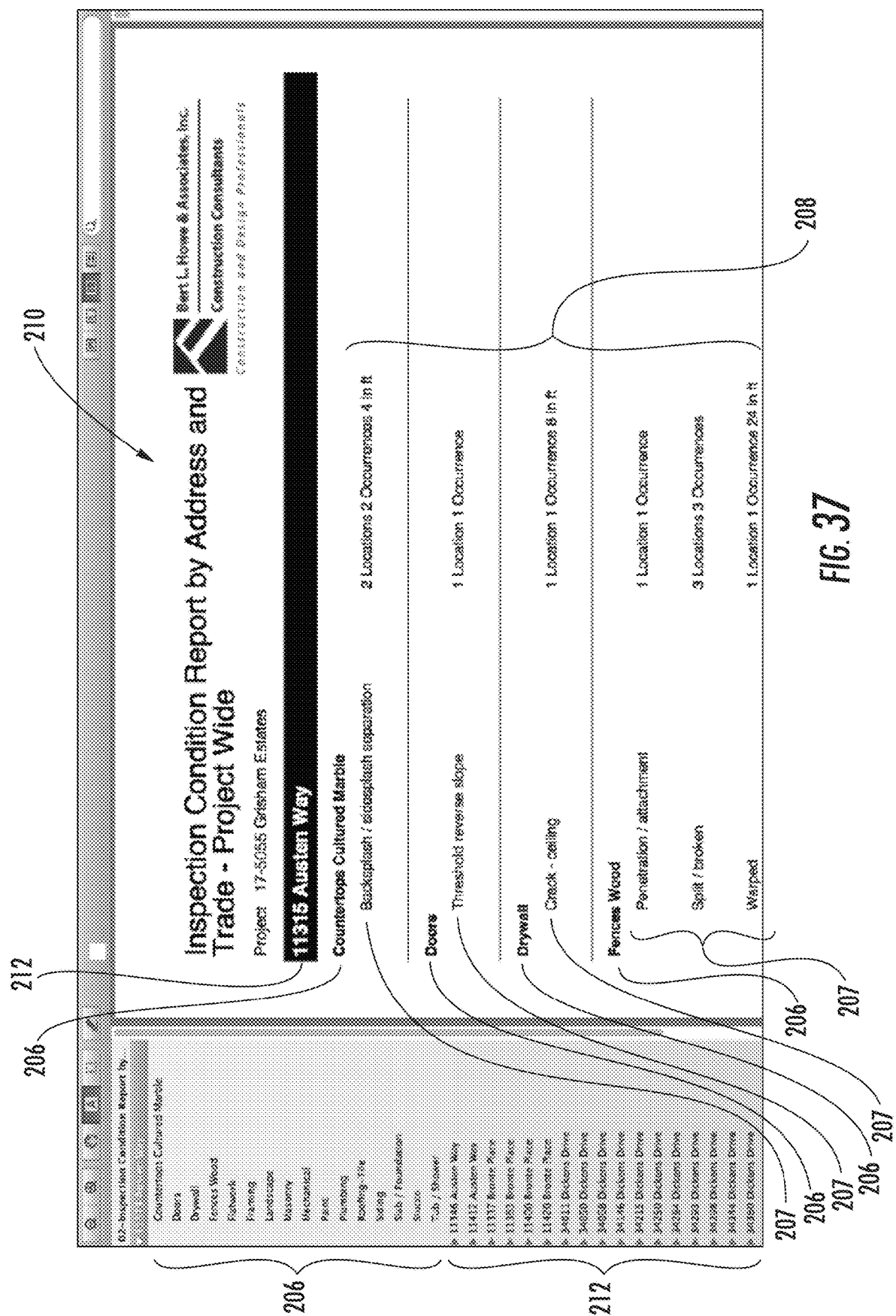
FIG. 37 is a screenshot of another formatted report.
Figure 38:
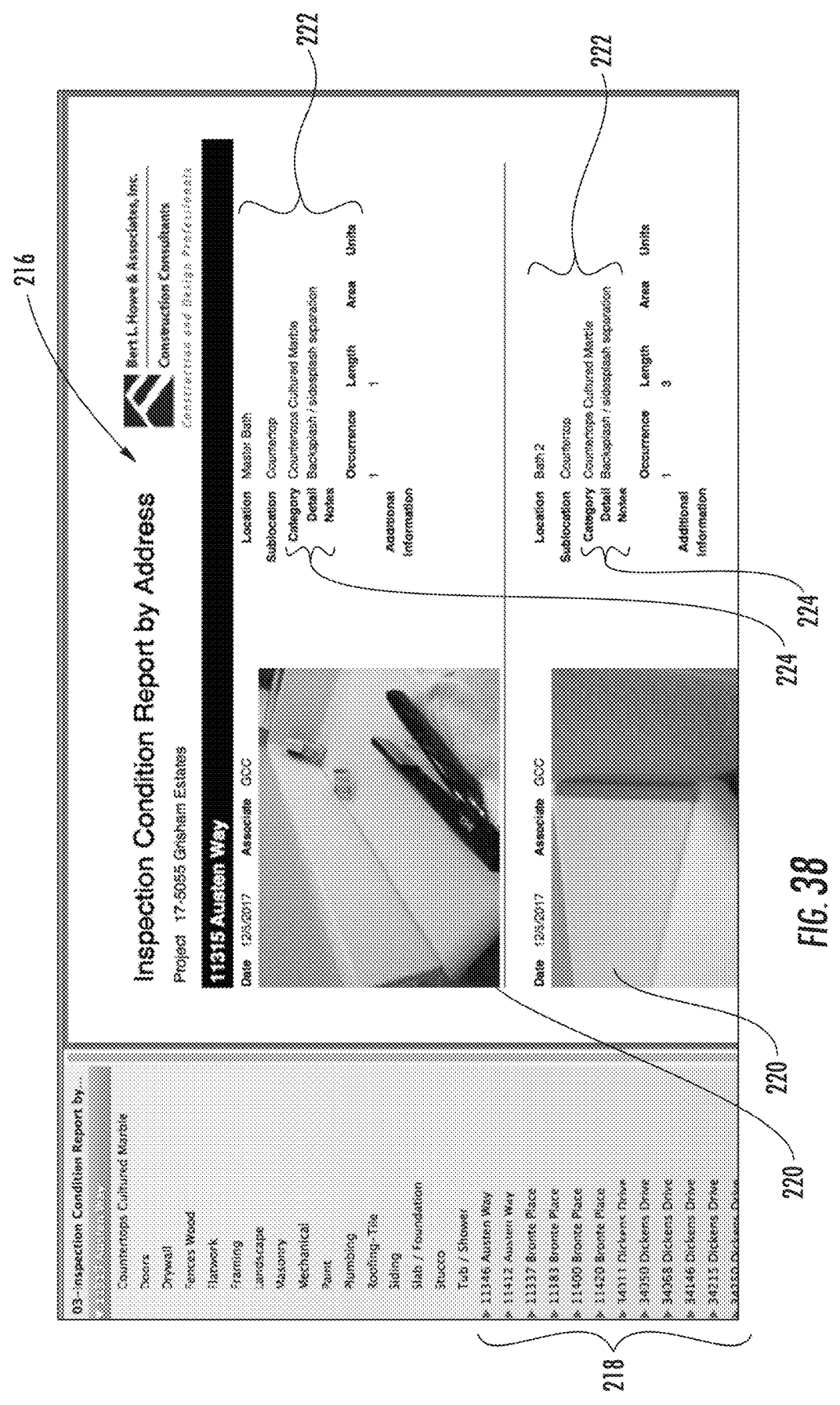
Figure 39:
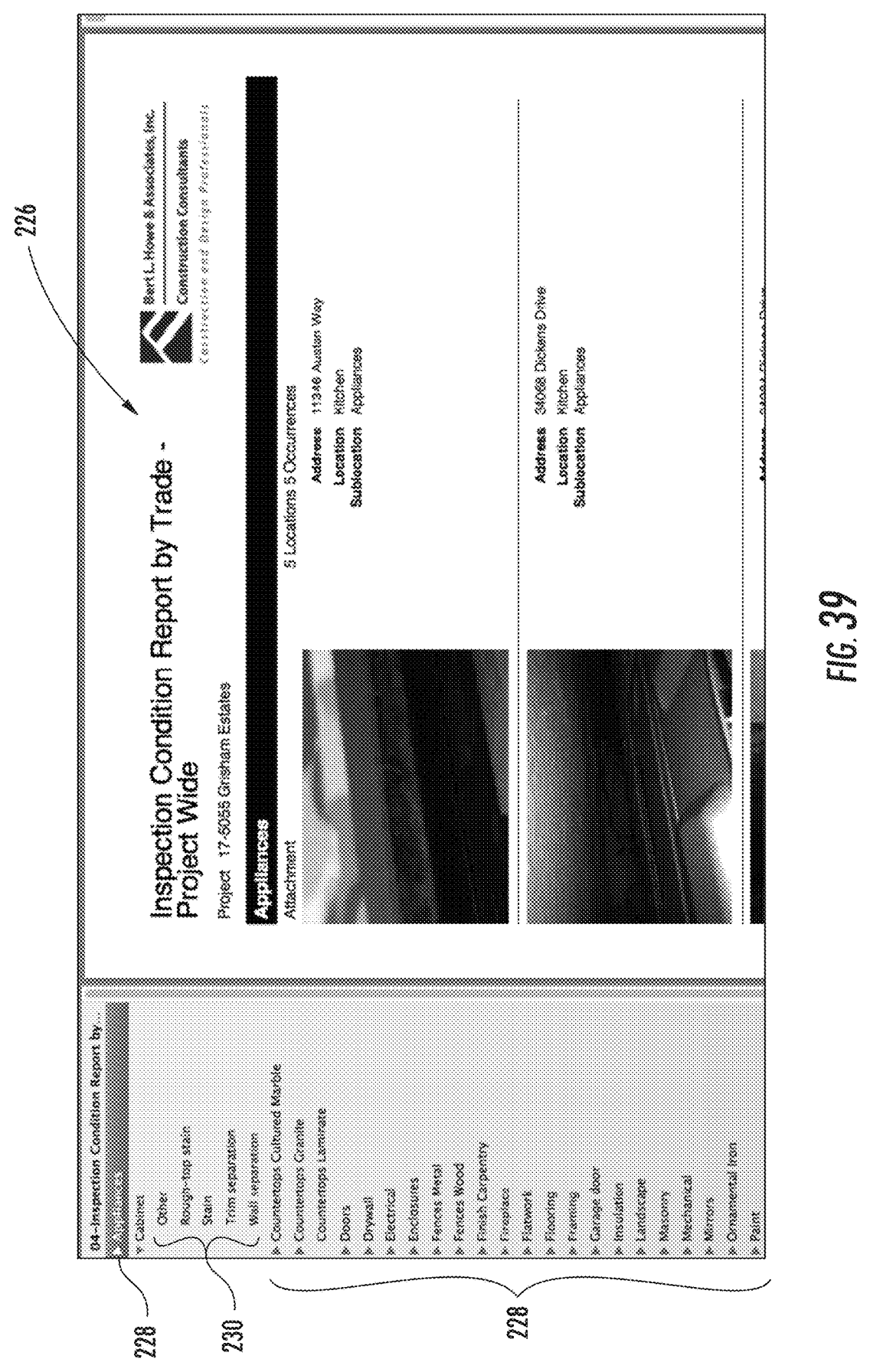
Figure 40:
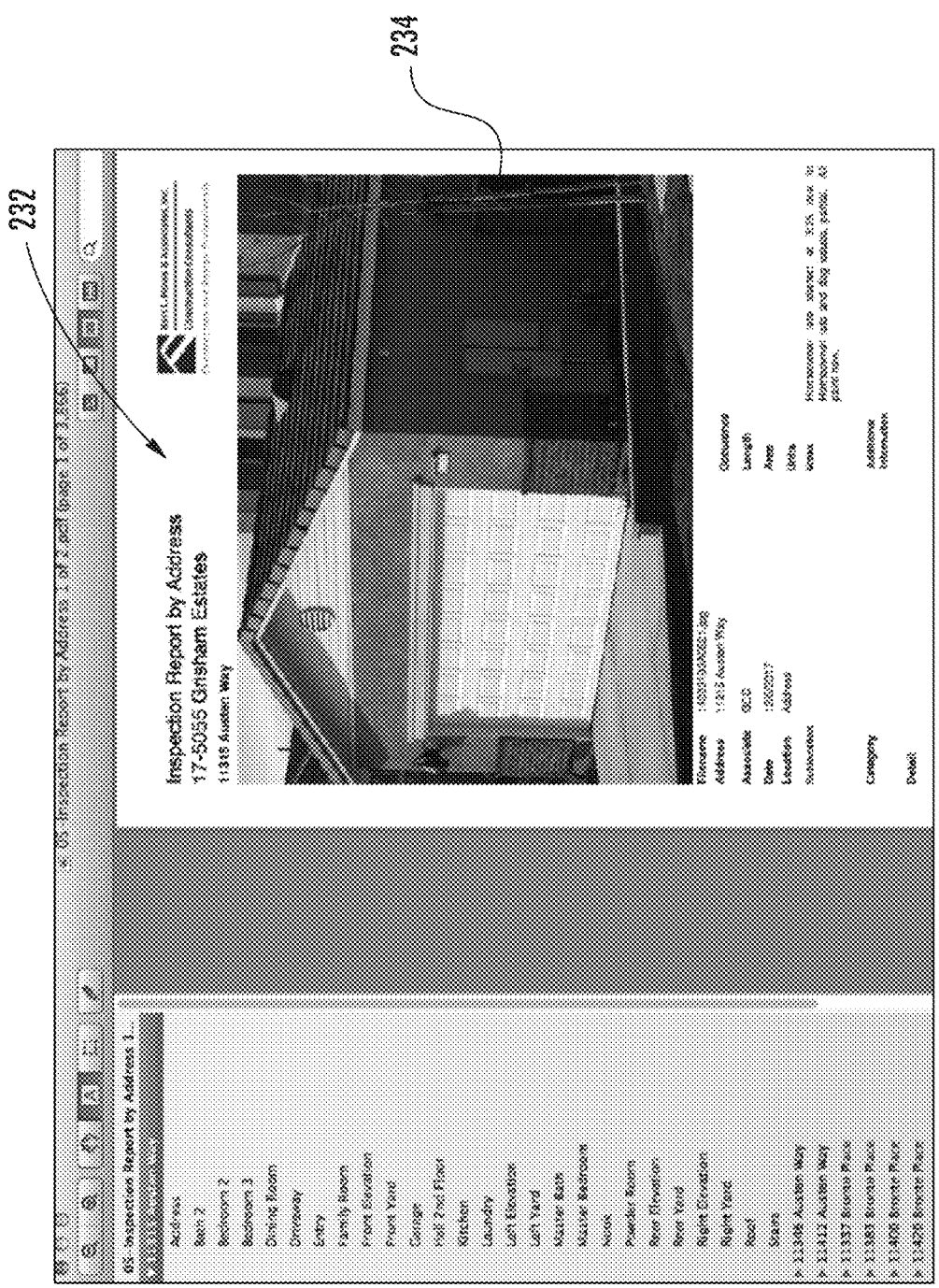
FIG. 40 is a screenshot of another formatted report.

After files are uploaded to the webserver, a report generator program takes all relevant data for a particular project (including multiple users and dates, if applicable), and generates uniquely formatted reports shown in FIGS. 36-41. The reports can instantly be generated and shared to desired recipients. Four of the reports relate to conditions, which are made up of data from the Category and Detail fields. FIG. 36 shows a sample of a report titled "Inspection Condition Report—Project Wide 204," which is sorted by Category 206 and Details 207. The report 204 provides a quick look at the number of locations and occurrences 208 for each category 206 and details 207 or condition. The next report (FIG. 37) is called "Inspection Condition Report by Address and Trade—Project Wide 210," and is sorted by Address 212. Each address 212 has a category 206 and details 207. Each detail has its respective number of locations and occurrences 208. Another report called "Inspection Condition Report by Address 216" (FIG. 38) is also sorted by Address 218. It also displays a small photo 220 with data 222 from all categories, but it only includes shots that have Conditions 224 associated with it (i.e. Category and Details were selected). Another report is the report titled "Inspection Condition Report by Trade—Project Wide 226 (FIG. 39)," which is similar to the previous report, however, it is sorted by Category 228 and Detail 230. Yet another report called "Inspection Report by Address 232 (FIG. 40)" has a large photo 234 for every shot, regardless of whether a Category and Detail has been selected, and includes all data associated with the particular shot. Since there could conceivably be thousands of shots in one file, the program is set up to automatically split the file when it becomes too large, and it renames the files accordingly (e.g. 1 of 3, 2 of 3, 3 of 3). Finally, the Property Inspected Report 236 (FIG. 41) is a text-only report that provides a snap-shot of each address inspected 238 with users 240, dates 242, inspection types 244, and photo counts 246 listed.

It can be appreciated that the inspection system and method of the present disclosure eliminates the overhead associated with an employee having to spend time analyzing and figuring out occurrences, sorting through photos to find out how many stucco cracks, or how many windows were inspected. The inspection system and method of the present disclosure also provides clients with immediate and detailed inspection results. Each report also has an automated bookmarking feature, which provides for easy and quick access to specific conditions, addresses, or locations and allows the client to jump directly to the information the client is searching.

Figure 42:
FIG. 42 is a screenshot of a video labeled with identifiers by the video labeler program.

Referring now to FIG. 42, the inspection system includes a video labeler program that automatically adds the names of the project 248, address 249, location 250, and sublocation 251 to the video 252. The video labeler program may take all of the individual videos taken for a particular address and combine them into one video. The program creates all photos and videos using each record number as an index. A photo is created for each video so that there will be a photo for each record in a project even if a video was taken. For example, if a video is taken at record 5 then a picture is also created at record 5. Both picture and video are labeled with a 5 and the user enters data for record 5. All the data that will be used to create a context for video 5 comes from record 5.

The program reads the project, address, location, and sublocation and appends videos together based on location. For example, all videos for bedroom one will be appended and all different sublocations will be encoded on the video to be displayed at playback. When a client views a video, they have a contextualized, easy to watch video for each address, and they can easily tell what location or sublocation they are seeing by looking at the bottom left of the video, which displays that information.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for acquiring and reporting statistical data about negative conditions in a plurality of properties within a construction project, the system comprising:
   a processor;
   a camera configured to capture images of construction features having negative conditions;
   a non-transitory storage medium containing
      interactive floor plans pre-associated with different property addresses within a plurality of projects, each floor plan having a plurality of areas corresponding to locations within a property,
      a list of locations pre-associated with each floor plan,
      a list of potential negative conditions,
      an inspection program,
      an image association program,
      a report generator; and
   a graphical user interface communicating with the processor, the camera, and the non-transitory storage medium, and configured to
      display the interactive floor plans stored in the memory, and
      allow a user to select a location by selecting the corresponding area on an interactive floor plan;
   wherein
      the inspection program includes a first set of instructions that, when executed by the processor, cause the graphical user interface to
      allow the user to select a project,
      responsive to selection of a project file, provide a form having a property address field, and a location field
      responsive to entry of a property address in the property address field and selection of the address field, display a floor plan pre-associated with the property address,
      allow the user to capture an image of a construction feature having a negative condition,
      responsive to capturing of the image, prompt the user to select an area on the floor plan corresponding to the location where the image was captured,
      responsive to selection of an area on the floor plan, automatically populate the location field with the location corresponding to the selected area,
      allow the user to select the name of a negative condition of the construction feature from a negative condition menu and enter the selected name in a detail field,
      allow the user to enter the number of occurrences of the negative condition at the location in an additional detail field, and
      allow the user to save the image and data entered in the property address, location, and detail fields;
   the image association program includes a second set of instructions that, when executed by the processor,
      creates a record for each image saved by the user, the record containing the image, the location where the image was captured, the name of the negative condition, and the number of occurrences of the negative condition at the location, and
      stores the record in a project file associated with the project; and
   the report generator includes a third set of instructions that, responsive to a request for a project-wide report,
      cause the processor to access the file associated with the project,
      read the number of occurrences of each negative condition in each record within the file,
      calculate a number of locations where each negative condition can be found and total number of occurrences of each negative condition; and
      generate a table showing negative conditions within the project, the number of inspection locations within the project where each negative condition can be found, and the total number of occurrences of each negative condition within the project.

2. The system according to claim 1, wherein the camera and the interface are integrated in a mobile inspection device.

3. The system according to claim 1, wherein: the non-transitory storage medium further contains a list of sublocations pre-associated with each location, and a list of trade categories pre-associated with each sublocation, wherein each negative condition is pre-associated with one of the trade categories; and the first set of instructions cause the graphical user interface to responsive to selection of a location, allow the user to select the sublocation where the image was captured from a sublocation menu listing all the sublocations pre-associated with the selected location and enter the selected sublocation in a sublocation field, and responsive to selection of a sublocation, allow the user to select a trade category corresponding to the negative condition of the construction feature shown in the image from a trade category menu listing all the trade categories pre-associated with the selected sublocation.

4. The system according to claim 3, wherein the second set of instructions include instructions to save the selected sublocation and trade category in the record for each image.

5. The system according to claim 4, wherein the table generated by the report generator includes the trade category pre-associated with each negative condition.

6. The system according to claim 4, wherein the first set of instructions, when executed by the processor, cause the graphical user interface to allow the user to: input a new sublocation if the sublocation of the image is not listed in the sublocation menu; input a new trade category if a trade category corresponding to the negative condition is not listed in the trade category menu; and input a new negative condition if the negative condition in the image is not listed in the negative condition menu.

* * * * *